(12) United States Patent
Ishihara et al.

(10) Patent No.: US 8,441,457 B2
(45) Date of Patent: May 14, 2013

(54) SENSOR DEVICE, METHOD OF DRIVING SENSOR ELEMENT, DISPLAY DEVICE WITH INPUT FUNCTION AND ELECTRONIC UNIT

(75) Inventors: Keiichiro Ishihara, Aichi (JP); Michiru Senda, Aichi (JP); Makoto Watanabe, Aichi (JP); Masanobu Ikeda, Aichi (JP); Yoshikazu Sasaki, Aichi (JP)

(73) Assignee: Sony Corporation, Tokyo (JP)

( * ) Notice: Subject to any disclaimer, the term of this patent is extended or adjusted under 35 U.S.C. 154(b) by 263 days.

(21) Appl. No.: 12/851,757

(22) Filed: Aug. 6, 2010

(65) Prior Publication Data
US 2011/0043470 A1 Feb. 24, 2011

(30) Foreign Application Priority Data
Aug. 19, 2009 (JP) ................................ 2009-190110

(51) Int. Cl.
*G06F 3/041* (2006.01)
*G06F 3/042* (2006.01)

(52) U.S. Cl.
USPC .......................................... 345/173; 345/175

(58) Field of Classification Search .................. 345/173, 345/175
See application file for complete search history.

(56) References Cited

U.S. PATENT DOCUMENTS

| | | | |
|---|---|---|---|
| 7,190,336 B2 | 3/2007 | Fujisawa | |
| 2004/0043676 A1* | 3/2004 | Tada et al. | 439/894 |
| 2006/0214892 A1 | 9/2006 | Harada et al. | |
| 2007/0215969 A1* | 9/2007 | Koide et al. | 257/431 |
| 2011/0141151 A1* | 6/2011 | Fujioka et al. | 345/690 |

FOREIGN PATENT DOCUMENTS

| | | |
|---|---|---|
| JP | 2004-127272 | 4/2004 |
| JP | 2006-276223 | 10/2006 |
| WO | WO2009/081810 | * 7/2009 |

* cited by examiner

*Primary Examiner* — Dwayne Bost
*Assistant Examiner* — Christopher Kohlman
(74) *Attorney, Agent, or Firm* — K&L Gates LLP

(57) ABSTRACT

A sensor device includes: one or more sensor elements each including first and second diode elements connected in series and a sensor driving section. The cathode of the second diode element is connected to the anode of the first diode element. The sensor driving section controls on-off state of the first diode element through changing a gate voltage under a fixed cathode voltage, and controls on-off state of the second diode element through changing a gate voltage under a fixed anode voltage. The sensor driving section drives the second diode element, maintaining a relationship of Vg2(off)<Vp2<Vg2(on), and, in off-to-on transition of the second diode element, overdrives the second diode element through temporarily applying a gate voltage Vg2(od) to the gate electrode, maintaining a relationship of Vg2(on)<Vg2(od). Vp2, Vg2(on) and Vg2(off) are the anode voltage, a on-state gate voltage and a off-state gate voltage of the second diode element, respectively.

9 Claims, 30 Drawing Sheets

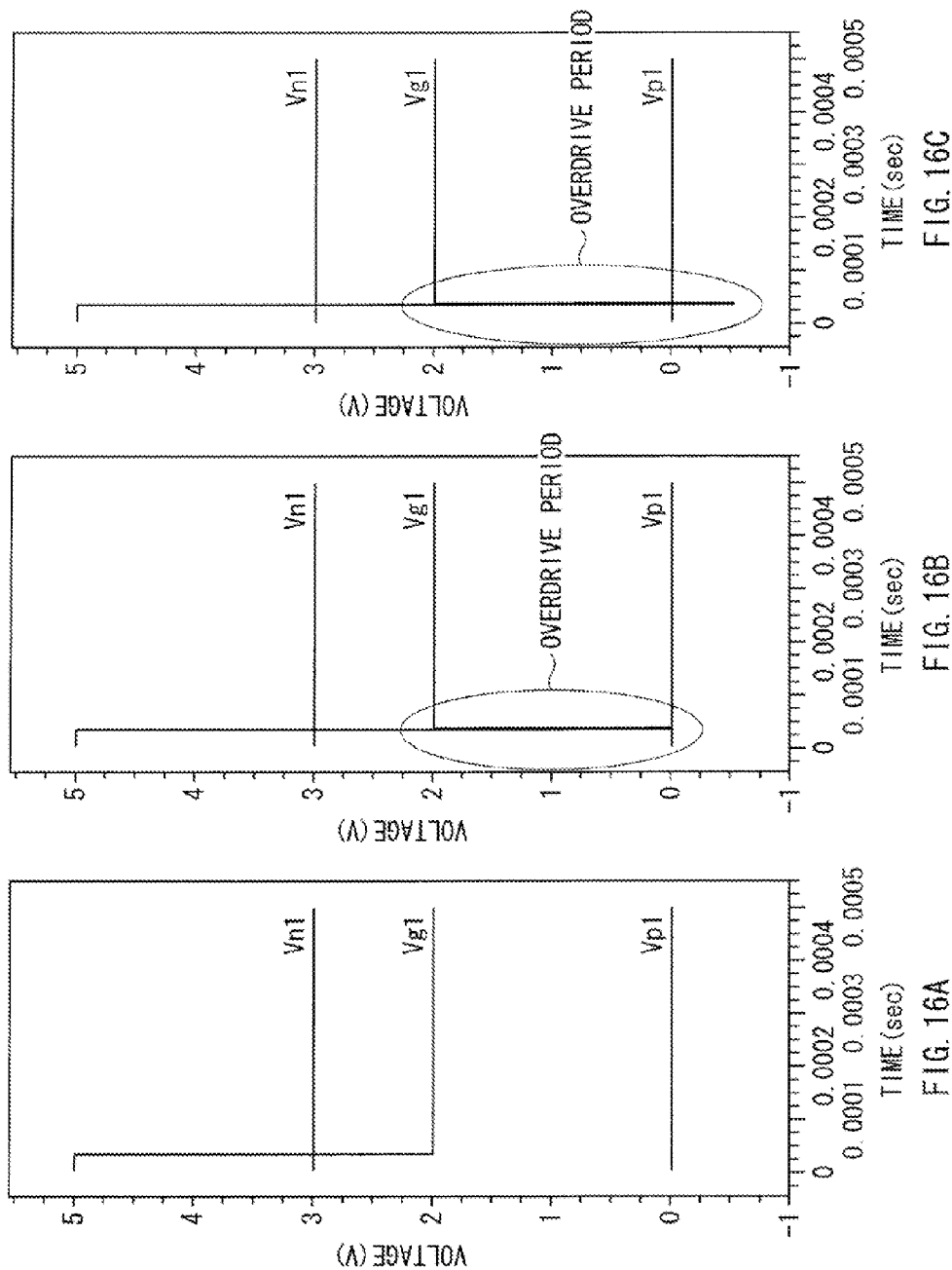

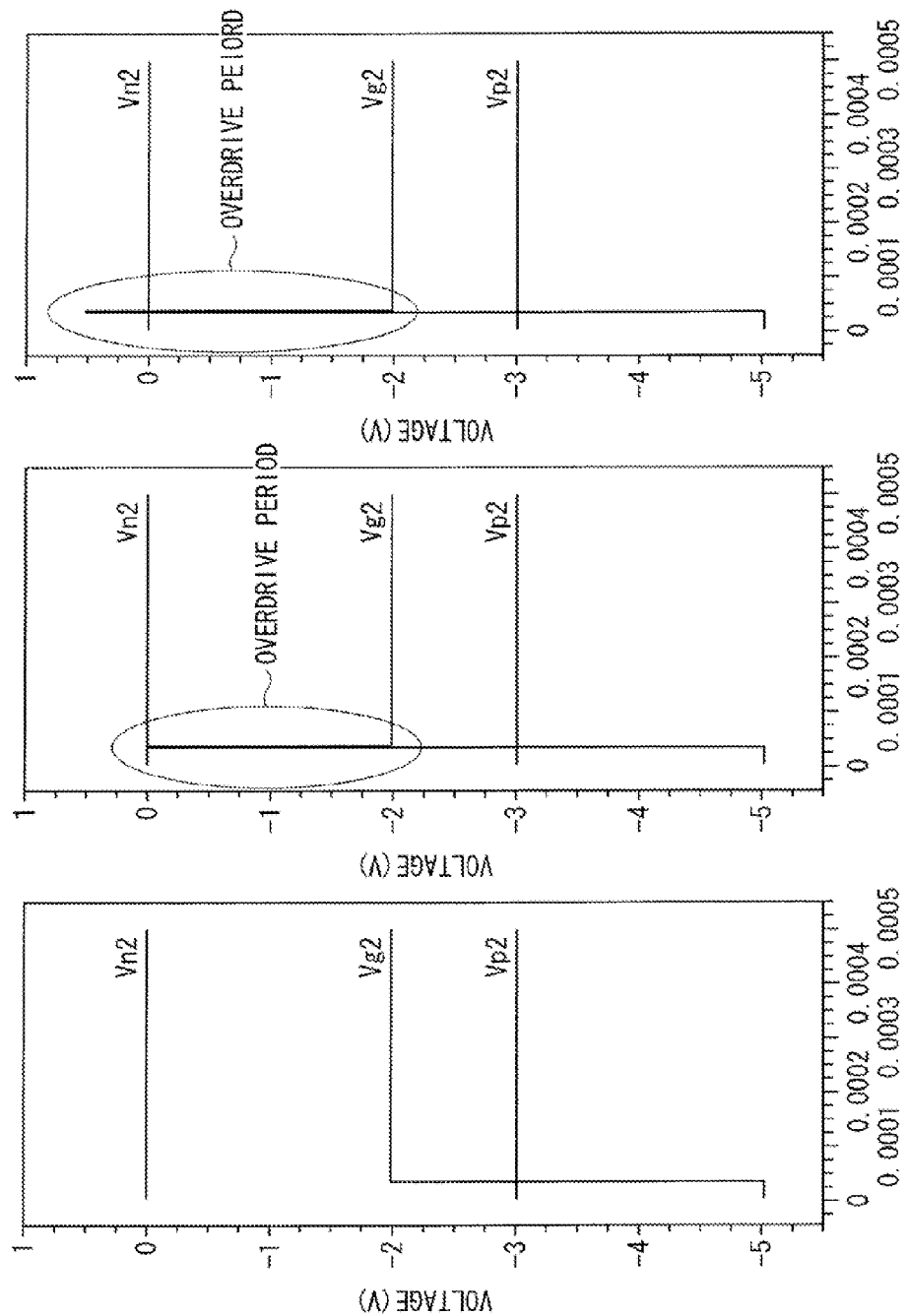

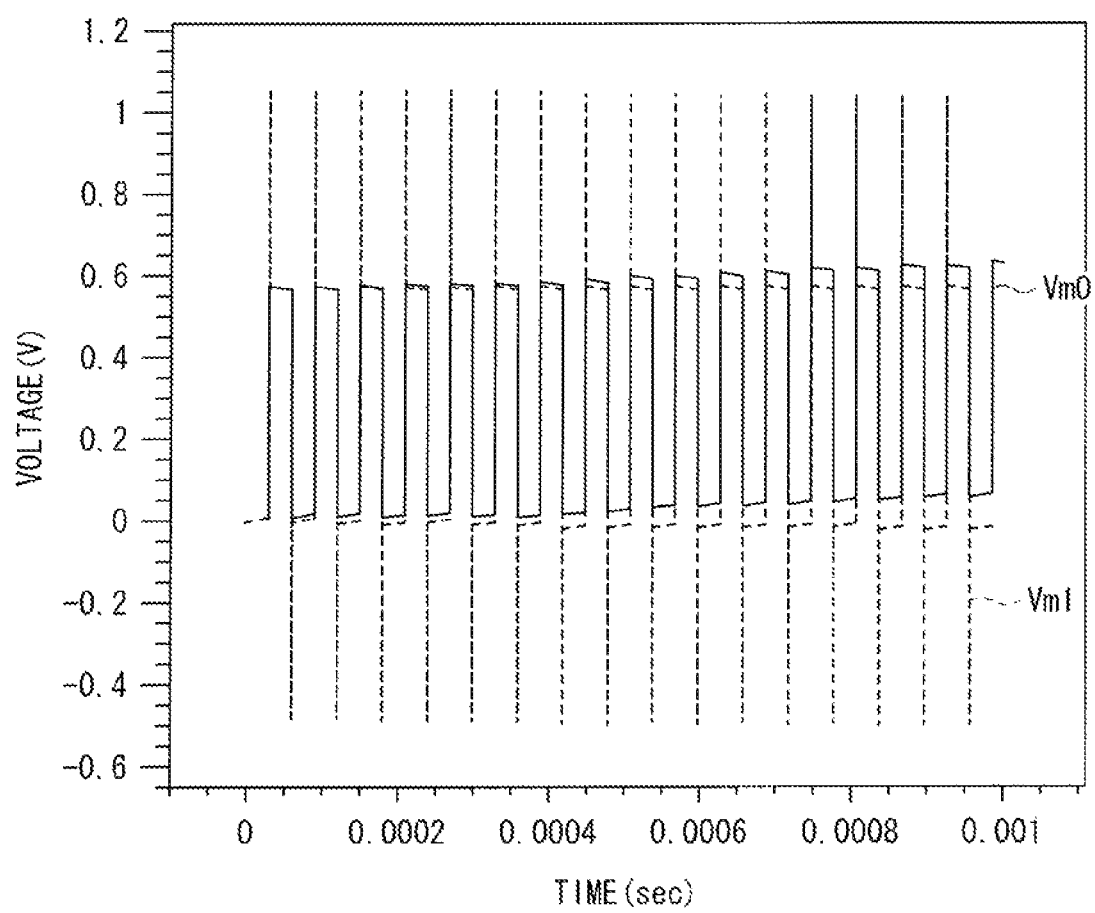
F I G. 22

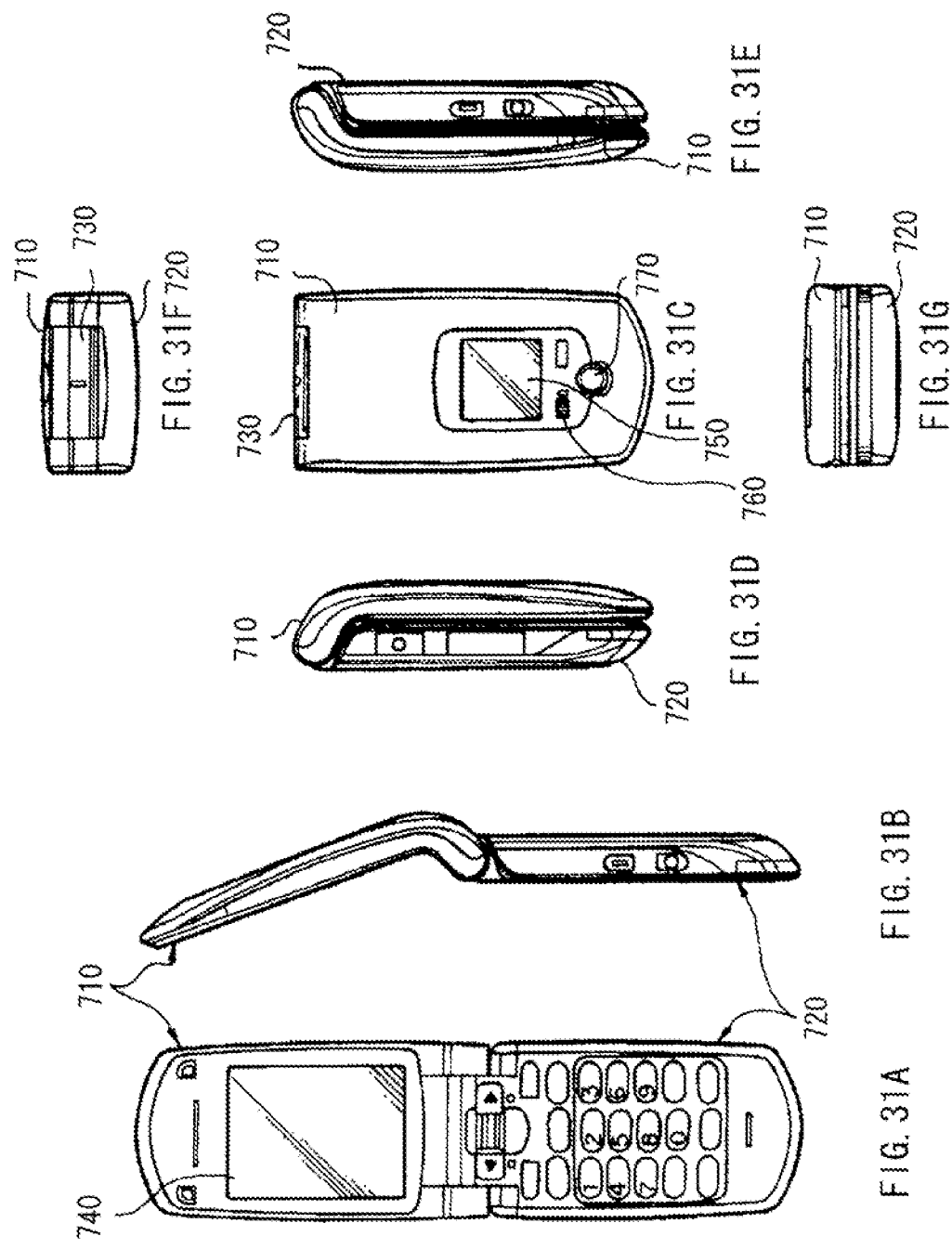

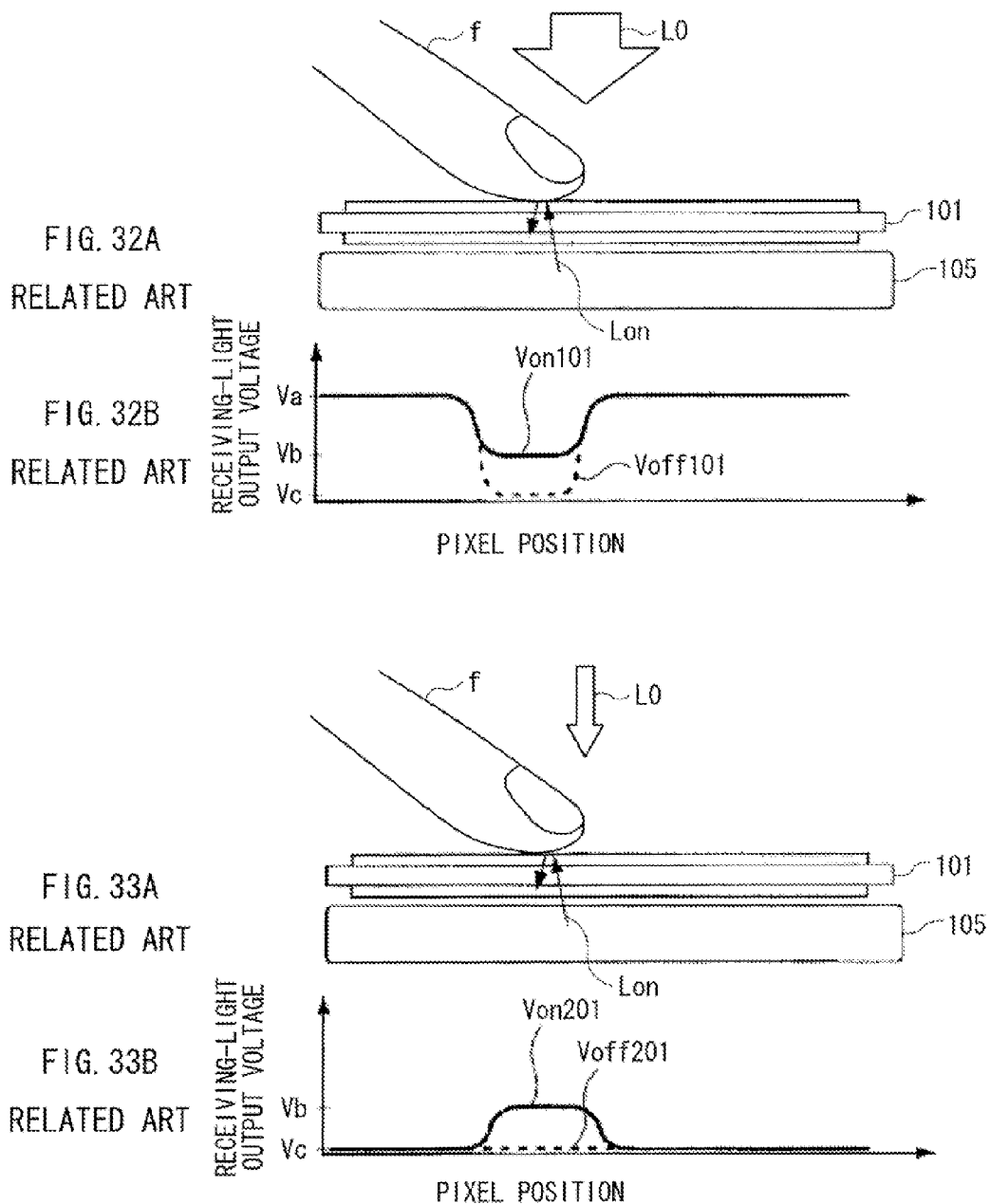

SENSOR DEVICE, METHOD OF DRIVING SENSOR ELEMENT, DISPLAY DEVICE WITH INPUT FUNCTION AND ELECTRONIC UNIT

CROSS REFERENCES TO RELATED APPLICATIONS

The present application claims priority to Japanese Priority Patent Application JP 2009-190110 filed in the Japan Patent Office on Aug. 19, 2009, the entire content of which is hereby incorporated by reference.

BACKGROUND

The present application relates to a sensor device that detects the position or the like of a proximity object by using a sensor element, a method of diving a sensor element applied to such a sensor device, a display device that includes a sensor function (input function) and a display function, and an electronic unit that includes such a display device.

There are known techniques of detecting the position of an object touching or close to a display surface of a display device. Among such techniques, there is a display device having a touch panel, which is typical and widespread.

There are various types of touch panel, among which a type that detects a capacitance is widely available in general. This type of touch panel is configured to detect, when a finger touches the touch panel, an object's position or the like by capturing a change in surface charge of the panel. Therefore, use of such a touch panel enables a user to carry out instinctive operation.

Further, each of Japanese Unexamined Patent Application Publications No. 2004-127272 and No. 2006-276223 has proposed a display device that includes a display section (display image-pickup panel) having a display function of displaying an image and an image pickup function (detection, sensor function) of imaging (detecting) an object.

SUMMARY

If the display device described in Japanese Unexamined Patent Application Publication No. 2004-127272 is used, when, for example, there is an action such as an approach of an object like a finger to the display image-pickup panel, it is possible to detect the position of the object based on a picked-up image, by using light emitted from the display image-pickup panel and then reflected from the object. Therefore, use of this display device makes it possible to detect an object's position or the like in a simple structure without additionally providing a component such as a touch panel on the display image-pickup panel.

However, when the light reflected from the object is used as described above, there is a case in which an issue is caused by a factor such as external light (ambient light), variations in characteristics of light-receiving elements, or the like. Specifically, there is a case in which the object's position or the like is difficult to be detected based on the picked-up image, because the intensity of received light changes according to the brightness of the external light. There is also a case in which the object's position or the like is difficult to be detected based on the picked-up image, because a factor such as the variations in the characteristics of the light-receiving elements becomes a fixed noise.

Thus, in Japanese Unexamined Patent Application Publication No. 2006-276223, an influence of the external light or the fixed noise mentioned above is removed by acquiring a difference between an image obtained in a light-emitted state (an image obtained by using the light reflected from the object) and an image obtained in a light-extinguished state.

To be more specific, when, for example, incident external light (ambient light) L0 is strong as illustrated in FIG. 32A, a received-light output voltage Von101 in a state in which a backlight 105 is on is as illustrated in FIG. 32B. In other words, the received-light output voltage Von101 is a voltage value Va according to the brightness of the ambient light L0 in any part of a display area 101 other than a part touched by a finger f. Further, at the part touched by the finger f in the display area 101, the received-light output voltage Von101 is reduced to a voltage value Vb corresponding to a reflectivity for reflecting irradiation light Lon from the backlight 105 off a surface of an object (finger f) that has touched the part at that moment. In contrast, a received-light output voltage Voff101 in a state in which the backlight 105 is off is, similarly, the voltage value Va according to the brightness of the ambient light L0 in the parts other than the part touched by the finger f, but at the part touched by the finger f, the ambient light L0 is in a state of being blocked and thus, the received-light output voltage Voff101 is a voltage value Vc at an extremely low level.

Furthermore, in a state in which the incident ambient light L0 is week (almost absent) as illustrated in FIG. 33A, a received-light output voltage Von201 in the state which the backlight 105 is on is as illustrated in FIG. 33B. In other words, in any part of the display area 101 other than the part touched by the finger f, the received-light output voltage Von201 is the voltage value Vc at the extremely low level because the ambient light L0 is absent. Moreover, at the part touched by the finger f in the display area 101, the received-light output voltage Von201 is increased to the voltage value Vb corresponding to the reflectivity for reflecting the irradiation light Lon from the backlight 105 off the surface of the object (finger f) that has touched the part at that moment. In contrast, at both of the part touched by the finger f and the other parts, the received-light output voltage Vff201 in the state in which the backlight 105 is off remains unchanged at the voltage value Vc at an extremely low level.

Thus, at the part untouched by the finger f in the display area 101, there is a great difference in terms of received-light output voltage between when the ambient light L0 is present and when the ambient light L0 is absent. In contrast, at the part touched by the finger f in the display area 101, the voltage value Vb at the time when the backlight 105 is on and the voltage value Vc at the time when the backlight 105 is off remain approximately the same regardless of the presence or absence of the ambient light L0. Therefore, by detecting a difference between a voltage at the time when the backlight 105 is on and a voltage at the time when the backlight 105 is off, it is possible to determine that a part, in which there is a difference not lower than a certain level such as the difference between the voltage value Vb and the voltage value Vc, is a part where there is an approach or the like of an object. For instance, it is conceivable that it will be possible to detect an object's position or the like without being affected by the external light or the fixed noise, like a differential image C illustrated in FIG. 34.

However, in a method of detecting an object by using the differential image C, there are provided a frame memory and the like for two images: an image obtained when a backlight is off (image A) and an image obtained when the backlight is on (image B) as, for example, illustrated in FIG. 34, which increases the cost of components.

As described above, according to the techniques in the past, it is difficult to stably detect an object touching or close to the panel without depending on use conditions while suppressing production cost and therefore, these techniques have room for improvement.

Thus, it is conceivable to provide, for example, a method of: providing a sensor element that includes a first photodiode for charging, a second photodiode for discharging and a capacitive element; performing alternate on-off control of the first and second photodiodes; and emitting, in a time sharing manner, irradiation light for detection to a proximity object in synchronization with the on-off control. In this method, when the irradiation light is emitted to the proximity object, electric charge for charging is stored in the capacitive element via the first photodiode, according to a sum of an amount of reflected light resulting from the irradiation light and an amount of ambient light. On the other hand, when the irradiation light is not emitted, electric charge for discharging is released from the capacitive element via the second photodiode, according to an amount of the ambient light. Through repetition of such charging and discharging operation, electric charge, which is based on a component representing only the light reflected from the proximity object and from which a component representing the ambient light is subtracted, is stored in the capacitive element. A signal according to the electric charge based on the component representing only the reflected light is extracted as a detection signal of the sensor element. By doing so, it is possible to obtain information about the proximity object without being affected by the ambient light. In this method, theoretically, there is obtained the detection signal after the ambient light is already removed and thus, the frame memories for the two images as mentioned above are unnecessary and instead, a single frame memory is sufficient.

When such a sensor element having the first photodiode for charging and the second photodiode for discharging is used, it is difficult to sufficiently subtract the component representing the ambient light if there is a difference between operation at the time of charging and operation at the time of discharging in terms of response characteristic for serving as a diode. As a result, there is a possibility that satisfactory detection will not be achieved. In order to implement stable detection operation, it is desirable to perform control that suppresses the difference in response characteristic between the two diodes.

In view of the foregoing, it is desirable to provide a sensor device, a method of driving a sensor element, a display device with an input function, and an electronic unit, which are capable of performing stable detection operation.

According to an embodiment, there is provided a sensor device including: one or more sensor elements each including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element; and a sensor driving section configured to control on-off state of the first diode element through changing a gate voltage under a condition of a fixed cathode voltage, and to control on-off state of the second diode element through changing a gate voltage under a condition of a fixed anode voltage, thereby driving the sensor elements. The sensor driving section drives the second diode element while maintaining a potential relationship represented by a following condition (1), and performs, in transition from off-state to on-state of the second diode element, overdrive on the second diode element through temporarily applying a gate voltage $Vg2(od)$ to the gate electrode while maintaining a potential relationship represented by a following condition (1A), where $Vp2$, $Vg2(on)$ and $Vg2(off)$ represent the anode volt-age, a gate voltage in the on-state, and a gate voltage in the off-state of the second diode element, respectively.

$$Vg2(\text{off}) < Vp2 < Vg2(\text{on}) \tag{1}$$

$$Vg2(\text{on}) < Vg2(\text{od}) \tag{1A}$$

Additionally, the sensor driving section drives the first diode element while maintaining a potential relationship represented by a following condition (2), and performs, in transition from off-state to on-state of the first diode element, overdrive on the first diode element through temporarily applying a gate voltage $Vg1(od)$ to the gate electrode while maintaining a potential relationship represented by a following condition (2A), where $Vn1$, $Vg1(on)$ and $Vg1(off)$ represent the cathode voltage, a gate voltage in the on-state, and a gate voltage in the off-state of the first diode element, respectively.

$$Vg1(\text{on}) < Vn1 < Vg1(\text{off}) \tag{2}$$

$$Vg1(\text{od}) < Vg1(\text{on}) \tag{2A}$$

The sensor device according to the embodiment may further include an irradiation light source controlled to be on or off in synchronization with the on-off states of the first and second diode elements, and emitting irradiation light for detection to a proximity object close to the sensor element; and a signal processing section obtaining, based on a detection signal acquired from the sensor element, object information including at least one of a position, a shape and a size of the proximity object.

Incidentally, the "proximity object" is not limited to the literal meaning of this word, but refers to, for example, an object in a state of touching a sensor panel in a case in which the sensor panel is formed by arranging two or more sensor elements in a matrix form within a single plane.

According to an embodiment, there is provided a method of driving a sensor element, comprising the steps of: providing one or more sensor elements each including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element; and controlling on-off state of the first diode element through changing a gate voltage under a condition of a fixed cathode voltage, and to control on-off state of the second diode element through changing a gate voltage under a condition of a fixed anode voltage, thereby driving the sensor elements. The second diode element is driven while maintaining a potential relationship represented by a following condition (1), and overdriven, in transition from off-state to on-state of the second diode element, through temporarily applying a gate voltage $Vg2(od)$ to the gate electrode while maintaining a potential relationship represented by a following condition (1A), where $Vp2$, $Vg2(on)$ and $Vg2(off)$ represent the anode voltage, a gate voltage in the on-state, and a gate voltage in the off-state of the second diode element, respectively.

$$Vg2(\text{off}) < Vp2 < Vg2(\text{on}) \tag{1}$$

$$Vg2(\text{on}) < Vg2(\text{od}) \tag{1A}$$

According to an embodiment, there is provided a display device with input function including: a display panel including a plurality of display pixels and a plurality of sensor elements, each of the sensor elements including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element; a display pixel driving section driving the display pixels; and a sensor driving section configured to control on-off state of the first diode element through changing a gate voltage under a condition of a fixed cathode voltage, and to control on-off state of the second diode element through changing a gate voltage under a condition of a fixed anode voltage, thereby driving the sensor elements. Further, driving control similar that performed by the sensor driving section of the above-described sensor device is performed on each of the plural sensor elements.

According to an embodiment, there is provided an electronic unit including the above-mentioned display device with input function.

In the sensor device, the method of driving the sensor element, the display device with input function or the electronic unit according to the embodiment, the first diode element and the second diode element of the sensor element are driven and controlled separately by using different voltages. As to the first diode element, the on-off state is controlled through changing the gate voltage under the condition of the fixed cathode voltage. As to the second diode element, the on-off state is controlled through changing the gate voltage under the condition of the fixed anode voltage. Each of the gate voltages is appropriately controlled under a predetermined voltage condition that suppresses a difference in response characteristic between the two diode elements.

In the sensor device, the method of driving the sensor element, the display device with input function or the electronic unit according to the embodiment, when the on-off states of the two diode elements in the sensor element are controlled, an appropriate gate voltage that suppresses a difference in response characteristic between the diode elements is applied and therefore, it is possible to perform stable detection operation while suppressing a difference in response characteristic between the two diode elements.

Additional features and advantages are described herein, and will be apparent from the following Detailed Description and the figures.

BRIEF DESCRIPTION OF THE FIGURES

FIGS. 16A through 16C are waveform diagrams that illustrate an example of the voltage value applied to the first diode element without the overdrive, a first example of the voltage value applied to the first diode element with the overdrive, and a second example of the voltage value applied to the first diode element with the overdrive, respectively;

FIGS. 17A through 17C are waveform diagrams that illustrate an example of the voltage value applied to the second diode element without the overdrive, a first example of the voltage value applied to the second diode element with the overdrive, and a second example of the voltage value applied to the second diode element with the overdrive, respectively;

FIG. 22 is a waveform diagram that illustrates a comparison between a storage voltage Vm0 illustrated in FIG. 20 and a storage voltage Vm1 illustrated in FIG. 21 when these voltages are enlarged;

FIGS. 31A through 31G are diagrams that illustrate a fifth application example, namely, FIGS. 31A and 31B are a front view and a side view in an open state, respectively, and FIGS. 31C through 31G are a front view, a left-side view, a right-side view, a top view, and a bottom view in a closed state, respectively;

FIGS. 32A and 32B are characteristic diagrams that illustrate an example of a method of detecting a proximity object by a display device with an input function in related art;

FIGS. 33A and 33B are characteristic diagrams that illustrate another example of a method of detecting a proximity object by a display device with an input function in related art.

DETAILED DESCRIPTION

The present application will be described in detail below with reference to the drawings according to an embodiment.

Entire configuration of display device with input function

Figure 1:
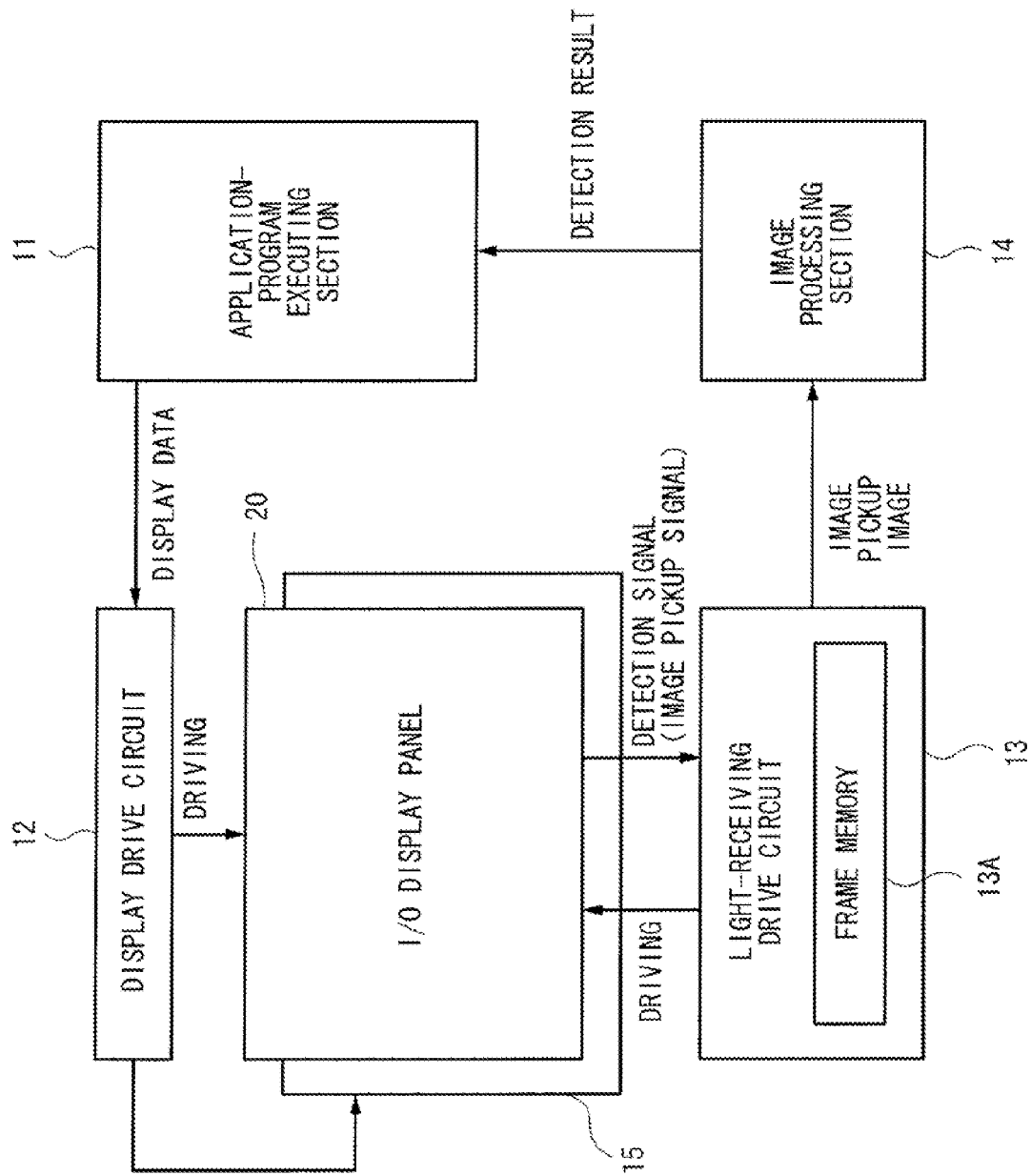
FIG. 1 is a block diagram that illustrates a configurational example of a display device with an input function according to an embodiment.

FIG. 1 illustrates an example of the entire configuration of a display device (display image-pickup device) with an input function according to an embodiment. This display device includes an I/O display panel 20, a backlight 15, a display drive circuit 12, a light-receiving drive circuit 13, an image processing section 14, and an application-program executing section 11.

Figure 3:
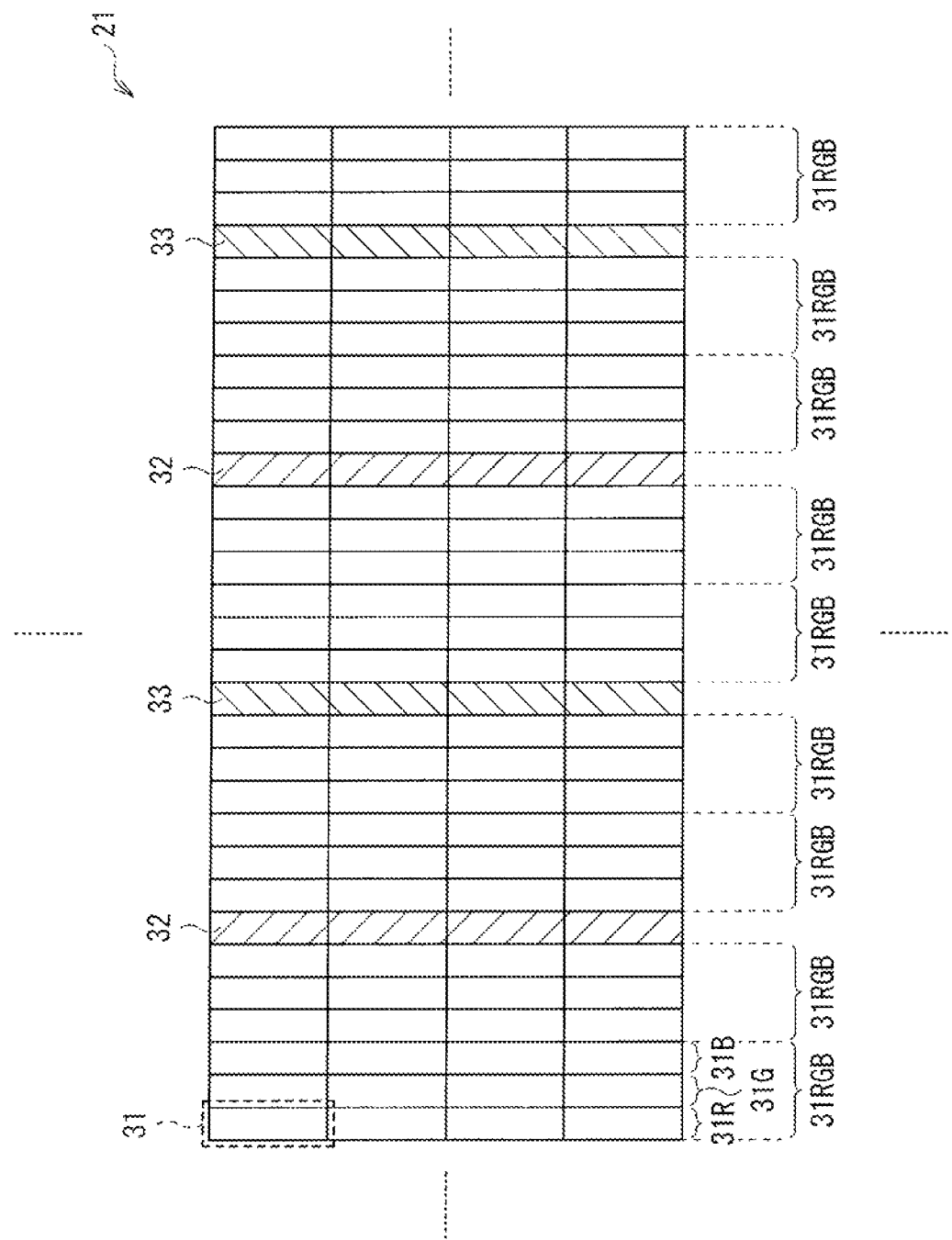
FIG. 3 is a plan view that illustrates an example of pixel arrangement in a display area (sensor area) illustrated in FIG. 2.

The I/O display panel 20 is, for example, a Liquid Crystal Display (LCD) panel. The I/O display panel 20 includes plural display pixels 31RGB arranged in a matrix form as illustrated in FIG. 3 to be described later, and has a function of displaying (display function) a predetermined image such as graphics and characters based on image data while line-sequentially operating these display pixels. The I/O display panel 20 further includes sensor elements 33 arranged as image pickup pixels in a matrix form as illustrated in FIG. 3 to be described later, and has an image pickup function (detection function, image pickup function) by detecting an object (proximity object) touching or close to the surface of the panel.

The backlight 15 is a light source for display and detection in the I/O display panel 20, and includes, for example, arranged plural light-emitting diodes. The backlight 15 is driven and controlled by the display drive circuit 12, and is capable of performing on-off (illuminating and not illuminating) operation at a high speed based on predetermined timing synchronized with operation timing of the I/O display panel 20, which will be described later.

The display drive circuit 12 is a circuit that drives the display pixels 31RGB of the I/O display panel 20 (performs driving of line-sequential display operation), so that an image is displayed on the I/O display panel 20 based on display data. The display drive circuit 12 also performs on-off (illuminating and not illuminating) control of the backlight 15.

The light-receiving drive circuit 13 is a circuit that drives the I/O display panel 20 (performs driving of line-sequential image pickup operation), so that a detection signal (image pickup signal) is obtained from each of the sensor elements (image pickup pixels) 33 of the I/O display panel 20 (so that an object is detected or imaged). The detection signals (image pickup signals) from the respective sensor elements 33 are stored in a frame memory 13A, for example, per frame, and output to the image processing section 14 as a detected image (picked-up image).

The image processing section 14 performs predetermined image processing (arithmetic processing) based on the picked-up image output from the light-receiving drive circuit 13. As a result of performing the image processing, the image processing section 14 detects and obtains, for example, object information about an object (positional coordinates data, data related to the shape and size of the object, and the like) that has made an approach or the like to the I/O display panel 20.

Based on a detection result obtained by the image processing section 14, the application-program executing section 11 performs processing according to a predetermined piece of application software. As an example of this processing, there is processing of including the positional coordinates of the detected object in the display data to be displayed on the I/O display panel 20. Incidentally, the display data produced by the application-program executing section 11 is supplied to the display drive circuit 12.

Configurational Example of I/O Display Panel 20

Figure 2:
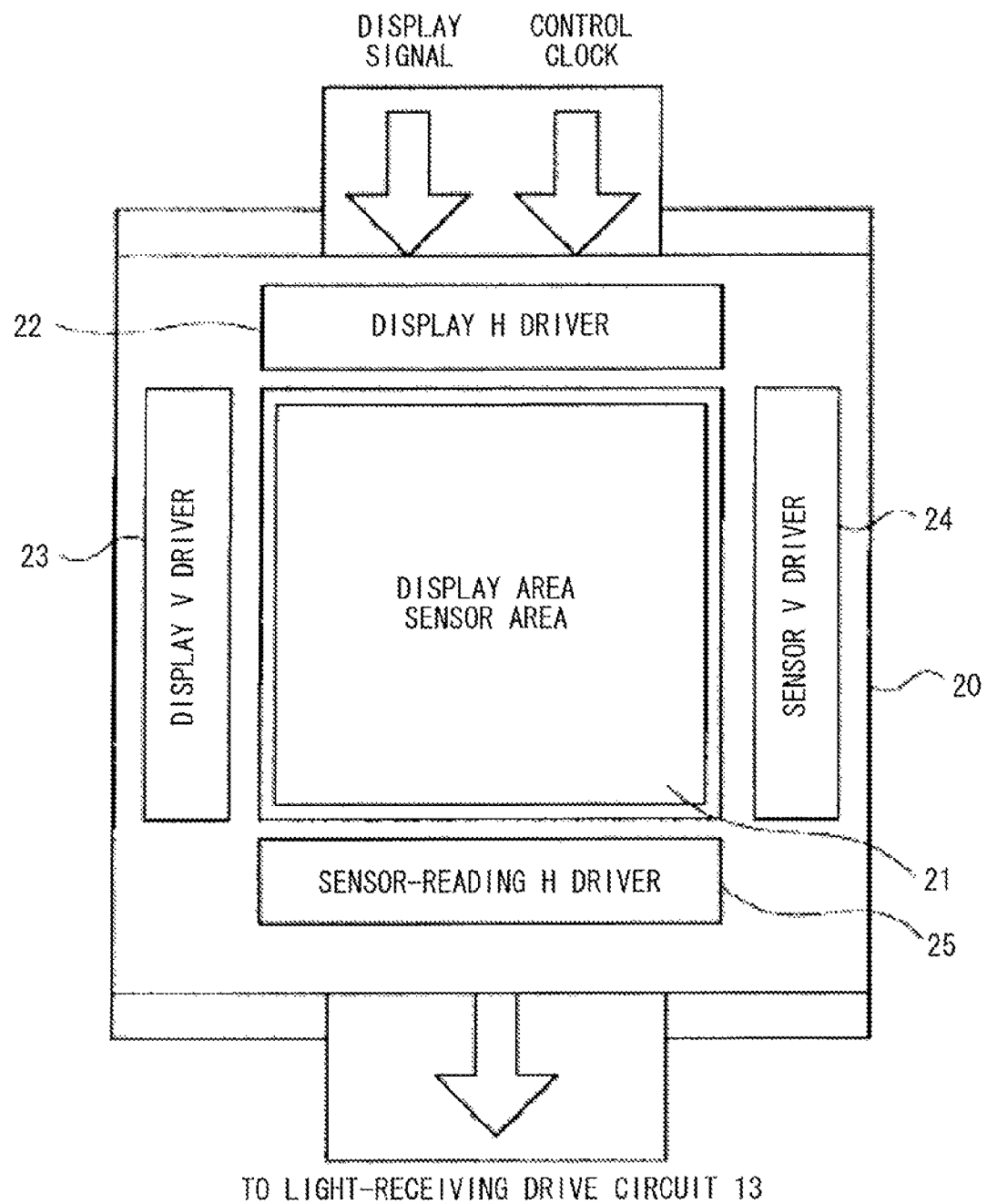
FIG. 2 is a block diagram that illustrates a configurational example of an I/O display panel illustrated in FIG. 1.

FIG. 2 illustrates a configurational example of the I/O display panel 20. The I/O display panel 20 includes a display area (sensor area) 21, a display H driver 22, a display V driver 23, a sensor-reading H driver 25, and a sensor V driver 24.

The light-receiving drive circuit 13, the sensor V driver 24, the sensor-reading H driver 25 in FIG. 1 and FIG. 2 combined are a specific example of the "means for driving the sensor element". The display drive circuit 12, the display H driver 22, and the display V driver 23 combined are a specific example of the "means for driving the display pixels". The I/O display panel 20 is a specific example of the "display panel". The backlight 15 is a specific example of the "irradiation light source". The light-receiving drive circuit 13 and the image processing section 14 combined are a specific example of the "means for processing a signal".

The display area (sensor area) 21 is an area that modulates light from the backlight 15 and emits the modulated light as irradiation light (hereinafter referring to light that includes display light and irradiation light for detection emitted by, for example, an infrared light source (not illustrated)). The display area (sensor area) 21 is also an area that detects (images) an object touching or close to this area. In the display area (sensor area) 21, the display pixels 31RGB e.g. liquid crystal display elements and the sensor elements 33 that will be described later are arranged in a matrix form.

Based on display signals for driving the display and control clocks supplied by the display drive circuit 12, the display H driver 22 line-sequentially drives, together with the display V driver 23, the display pixels 31RGB within the display area 21.

According to driving control by the light-receiving drive circuit 13, the sensor-reading H driver 25, together with the sensor V driver 24, line-sequentially drives the sensor elements 33 serving as the image pickup pixels within the sensor area 21, and obtains detection signals (image pickup signals). The light-receiving drive circuit 13 is configured to carry out, when the irradiation light is emitted from the backlight 15 to a proximity object, driving control to store electric charge for charging in the sensor elements 33 according to a sum of an amount of reflected light resulting from the irradiation light and an amount of ambient light (external light). Also, the light-receiving drive circuit 13 is configured to carry out, when the irradiation light is not emitted from the backlight 15, driving control to release electric charge for discharging from the sensor elements 33 according to an amount of ambient light. The sensor-reading H driver 25 is configured to output, to the light-receiving drive circuit 13, the detection signals (image pickup signals) obtained from the sensor elements 33 through these kinds of driving control.

Figure 4:
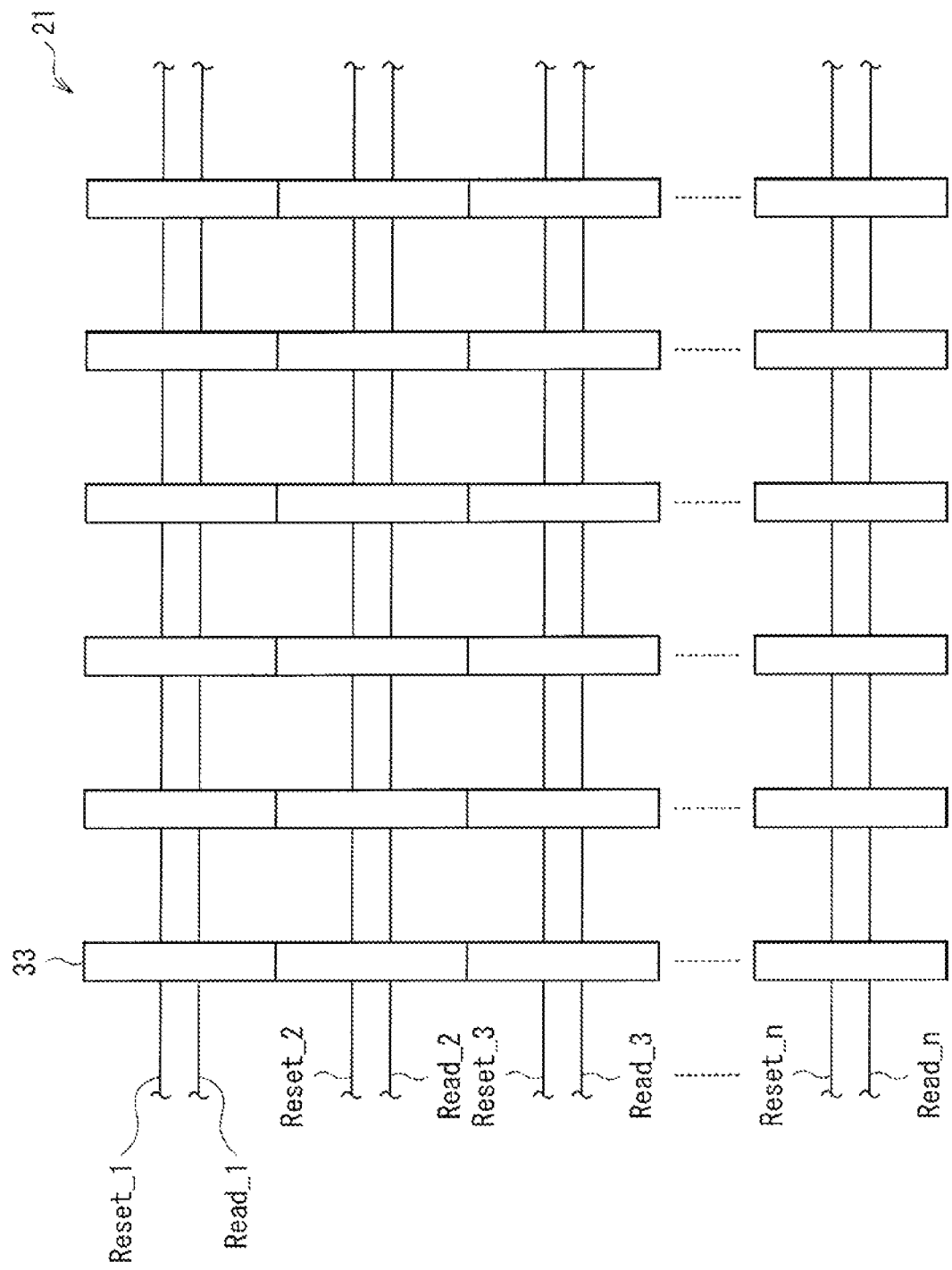
FIG. 4 is a schematic plan view that illustrates an example of a connection relation between sensor elements (image pickup pixels) and signal lines in the pixel arrangement illustrated in FIG. 3.

FIG. 3 illustrates a configurational example of each pixel in the display area (sensor area) 21 in detail. For example, as illustrated in FIG. 3, pixels 31 of the display area 21 include the display pixels 31RGB, the sensor elements 33 serving as the image pickup pixels and wiring sections 32 in which wirings for the sensor elements 33 are formed. Each of the display pixels 31RGB includes a display pixel 31R for red (R), a display pixel 31G for green (G) and a display pixel 31B for blue (B). The display pixels 31RGB, the sensor elements 33 and the wiring sections 32 are arranged in a matrix form on the display area (sensor area) 21. Further, the sensor elements 33 and the wiring sections 32 for driving the sensor elements 33 are arranged to be separated from each other periodically. Thanks to such an arrangement, a sensor area including the wiring sections 32 and the sensor elements 33 is extremely hard to recognize relative to the display pixels 31RGB, and a reduction in aperture ratio in the display pixels 31RGB is suppressed to a minimum. Furthermore, when the wiring sections 32 are disposed in an area that does not contribute to the aperture of the display pixels 31RGB (for example, an area shielded from light by a black matrix, or a reflection area), it is possible to dispose a light-receiving circuit without reducing display quality. Incidentally, for example, as illustrated in FIG. 4, reset signal lines Reset_1 through Reset_n and read signal lines Read_1 through Read_n are connected to each one of the sensor elements 33, along a horizontal line direction.

Configurational Example of Sensor Elements 33

Figure 5:
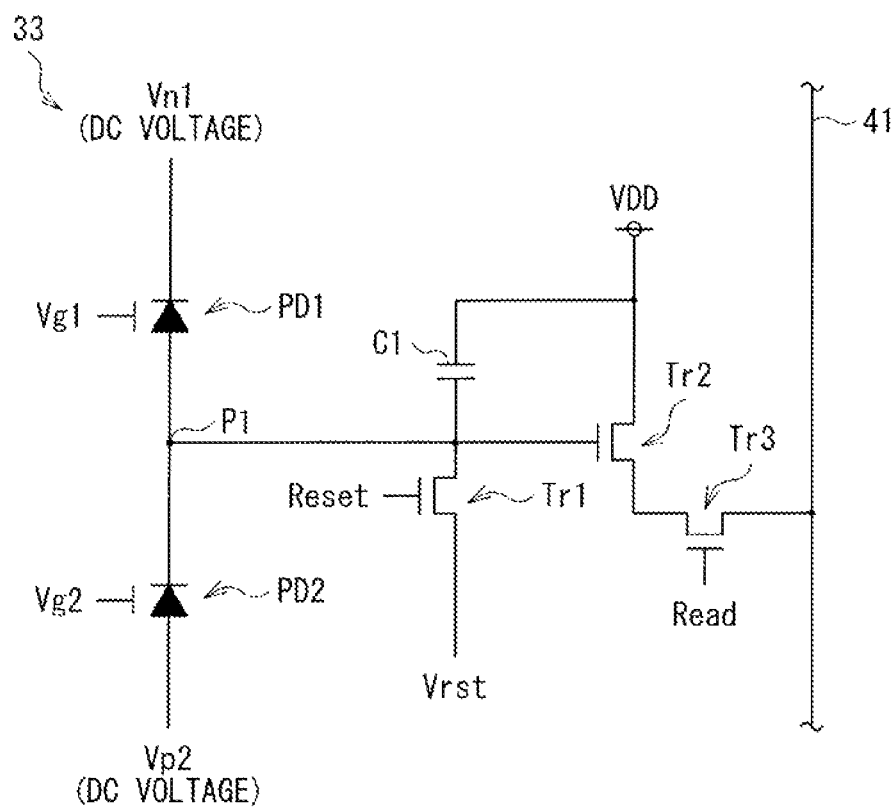
FIG. 5 is a circuit diagram that illustrates a configurational example of a sensor element in the display device illustrated in FIG. 1.

For example, as illustrated in FIG. 5, the sensor element 33 includes a first diode element PD1, a second diode element PD2, a capacitor C1 serving as a capacitive element, a first transistor Tr1, a second transistor Tr2 and a third transistor Tr3.

Each of the first diode element PD1 and the second diode element PD2 is a photoelectric conversion element that generates electric charge according to an amount of incident light. In particular, the first diode element PD1 generates electric charge for charging according to an amount of incident light, and the second diode element PD2 generates electric charge for discharging according to an amount of incident light. Each of the first diode element PD1 and the second diode element PD2 is, for example, a PIN photodiode. The PIN photodiode has a p-type semiconductor region, an n-type semiconductor region and an intrinsic semiconductor region (i region) formed between the p-type semiconductor region and the n-type semiconductor region. The first diode element PD1 has an anode electrode, a cathode electrode and a gate electrode. Similarly, the second diode element PD2 has an anode electrode, a cathode electrode and a gate electrode. When each of the first diode element PD1 and the second diode element PD2 is the PIN photodiode, the anode electrode is connected to the p-type semiconductor region, and the cathode electrode is connected to the n-type semiconductor region.

The first diode element PD1 and the second diode element PD2 are connected to each other in series when the anode electrode of the first diode element PD1 is connected to the cathode electrode of the second diode element PD2. One end of the capacitor C1 is connected to a connection point P1 between the first diode element PD1 and the second diode element PD2. The other end of the capacitor C1 is connected to a power source VDD.

Each of the first transistor Tr1 through Tr3 includes, for example, a Thin Film Transistor (TFT) and the like. A gate of the first transistor Tr1 is connected to the reset signal line Reset (see FIG. 4), and a source of the first transistor Tr1 is connected to a reset voltage source Vrst. A drain of the first transistor Tr1 and a gate of the second transistor Tr2 are connected, together with the one end of the capacitor C1, to the connection point P1 between the first diode element PD1 and the second diode element PD2. A source of the second transistor Tr2 is connected, together with the other end of the capacitor C1, to the power source VDD. A drain of the second transistor Tr2 is connected to a drain of the third transistor Tr3. A gate of the third transistor Tr3 is connected to the read signal line Read, and a source of the third transistor Tr3 is connected to a readout line 41. The reset power source Vrst is set to a voltage (reset voltage) that enables all the electric charge stored in the capacitor C1 to be released in the sensor element 33.

In the sensor element 33, the on-off state of the first diode element PD1 is controlled by changing a gate voltage Vg1 in a state in which a cathode voltage Vn1 is fixed. The on-off state of the second diode element PD2 is controlled by changing a gate voltage Vg2 in a state in which an anode voltage Vp2 is fixed. In the sensor element 33, the electric charge for charging generated in the first diode element PD1 is stored in the capacitor C1 when the first diode element PD1 is in the ON state and the second diode element PD2 is in the OFF state. In contrast, the electric charge for discharging generated in the second diode element PD2 is released from the capacitor C1 when the second diode element PD2 is in the ON state and the first diode element PD1 is in the OFF state. The light-receiving drive circuit 13 controls the on-off state of each of the first diode element PD1 and the second diode element PD2 individually, so that such storage operation and discharging operation are performed alternately.

Operation of Display Device

First, a summary of image display operation and object detection operation (image pickup operation) by this display device will be described.

In this display device, based on display data supplied by the application-program executing section 11, the display drive circuit 12 generates a drive signal for display. Based on this drive signal, the I/O display panel 20 is line-sequentially driven, and an image is displayed. At this time, the backlight 15 also is driven by the display drive circuit 12, so that on and off operation is performed in synchronization with the I/O display panel 20.

When there is an object (a proximity object such as a finger) touching or close to the I/O display panel 20, the object is detected (imaged) by the sensor elements (image pickup pixels) 33 in the I/O display panel 20 through line sequential image-pickup driving by the light-receiving drive circuit 13. A detection signal (image pickup signal) from each of the sensor elements 33 is supplied from the I/O display panel 20 to the light-receiving drive circuit 13. The light-receiving drive circuit 13 accumulates the detection signals of the sensor elements 33 for one frame and outputs the stored detection signals to the image processing section 14 as a picked-up image.

The image processing section 14 obtains object information about the object (such as positional coordinates data and data related to the shape and size of the object) touching or close to the I/O display panel 20, by performing predetermined image processing (arithmetic processing) based on this picked-up image. For example, the arithmetic processing to determine a barycenter of the picked-up image for one frame produced in the light-receiving drive circuit 13 is performed, and a contact (approach) center is identified. Subsequently, a result of detecting the proximity object is output from the image processing section 14 to the application-program executing section 11. The application-program executing section 11 executes an application program as will be described later.

Figure 8:
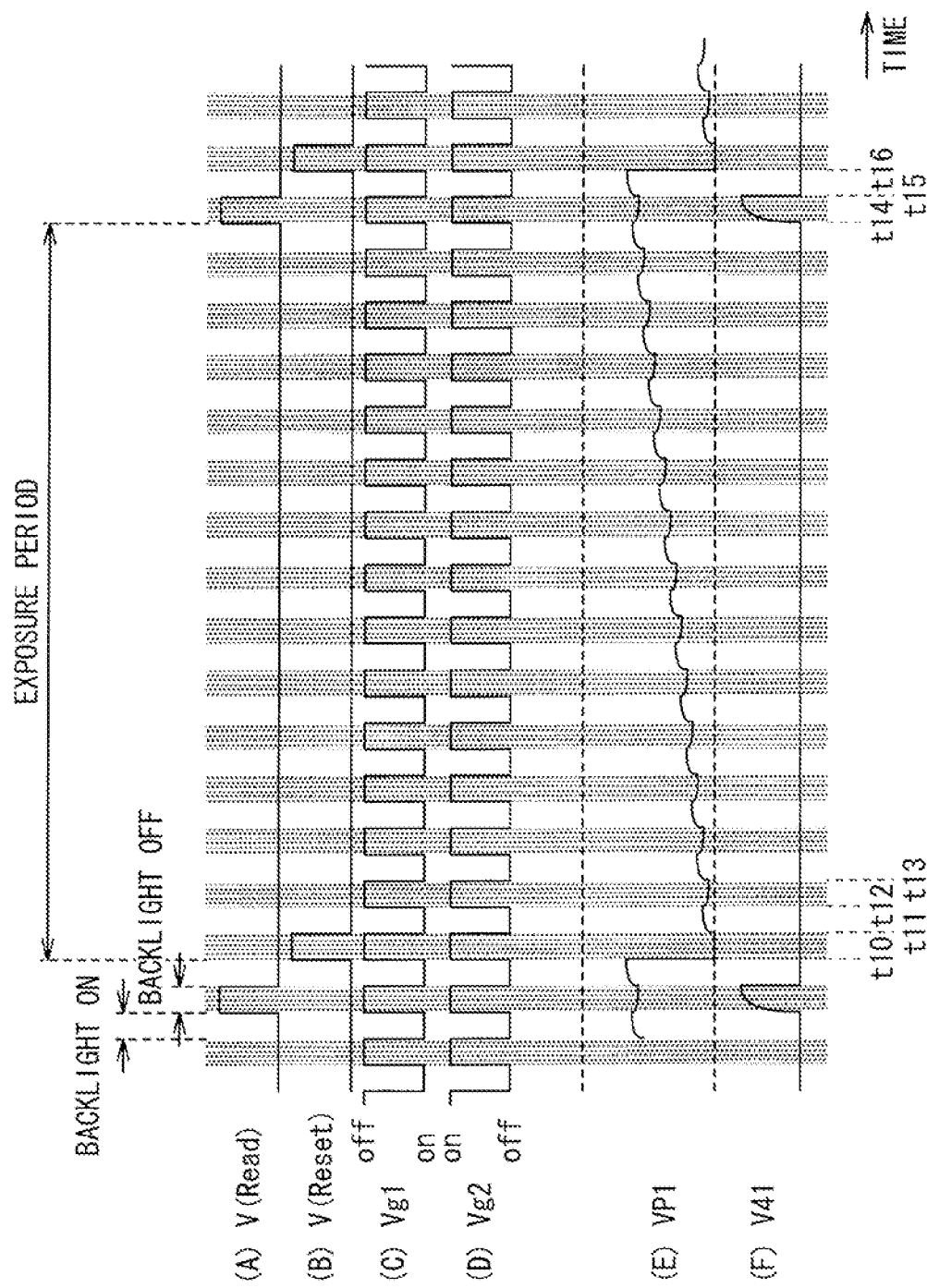
FIG. 8 is a timing waveform diagram that illustrates an example of proximity-object detection processing (image pickup operation) in the display device illustrated in FIG. 1.
Figure 9:
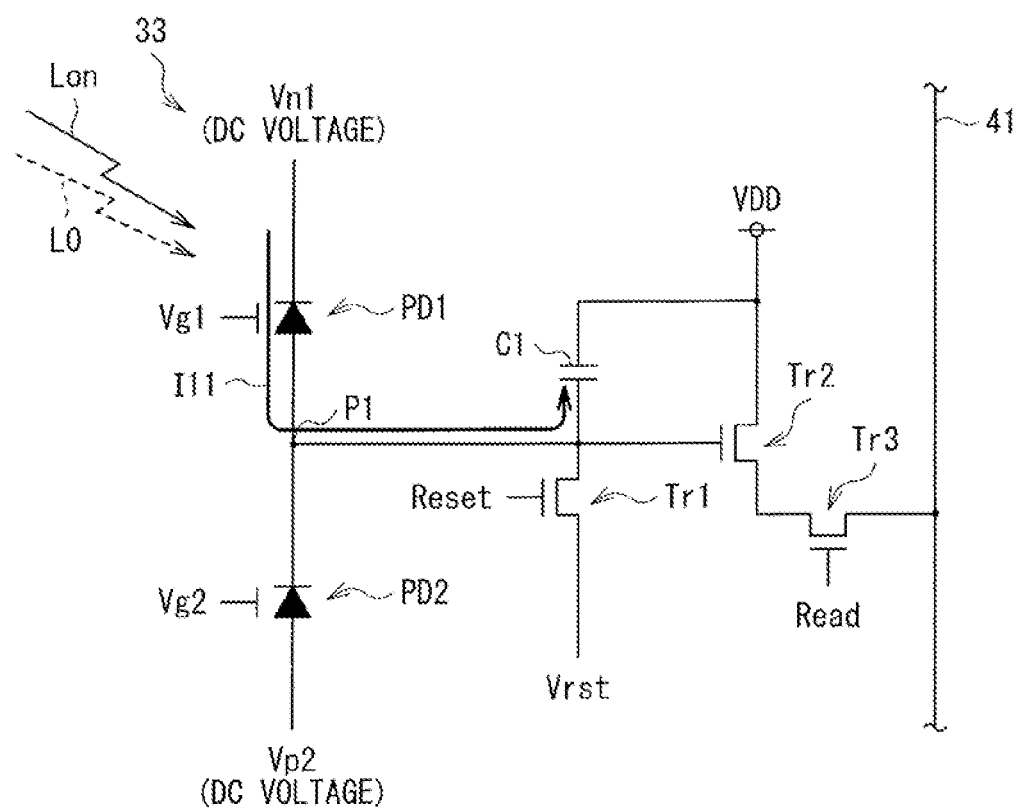
FIG. 9 is a circuit diagram for explaining charging operation in the proximity-object detection processing illustrated in FIG. 8.
Figure 10:
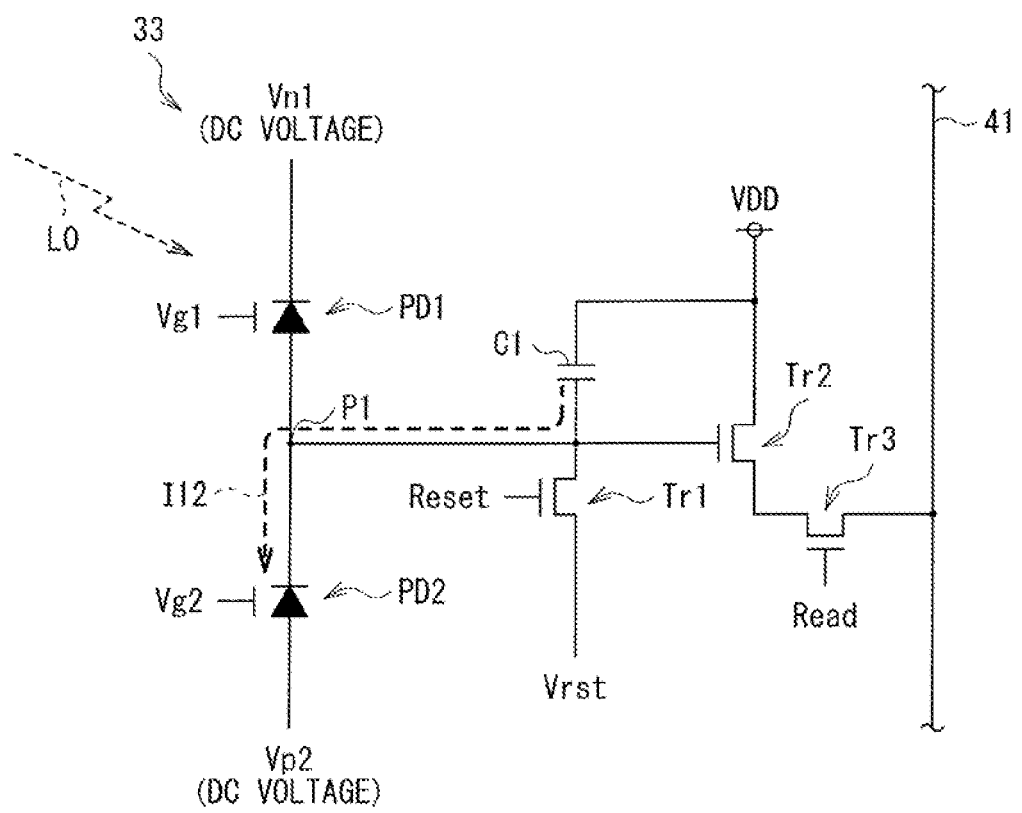
FIG. 10 is a circuit diagram for explaining discharging operation in the proximity-object detection processing illustrated in FIG. 8.

Next, the detection operation (image pickup operation) by this display device will be described with reference to FIG. 8 through FIG. 10. Parts (A) through (F) of FIG. 8 illustrate, using timing waveforms, an example of the detection operation (detection or image pickup operation in one of the sensor elements 33) performed by this display device. Part (A) of FIG. 8 illustrates an example of the timing waveform of a reset signal voltage V(Reset), and Part (B) illustrates an example of the timing waveform of a read signal voltage V(Read). Part (C) of FIG. 8 illustrates an example of the timing waveform (substantially, a timing waveform representing the on-off state of the first diode element PD1) of the gate voltage Vg1 in the first diode element PD1 of the sensor element 33. Part (D) of FIG. 8 illustrates an example of the timing waveform (substantially, a timing waveform representing the on-off state of the second diode element PD2) of the gate voltage Vg2 in the second diode element PD2. Part (E) of FIG. 8 illustrates an example of the timing waveform of a potential (storage potential) at the connection point (storage node) P1 in the sensor element 33, and Part (F) of FIG. 8 illustrates an example of the timing waveform of a potential (read potential) V41 in the readout line 41.

Each of the reset signal voltage V(Reset) and the read signal voltage V(Read) illustrated in parts (A) and (B) of FIG. 8, respectively, is in a H (high) state by the line-sequential operation. In the I/O display panel 20, at the sensor elements 33 on each horizontal line, a period starting from the time when the reset signal voltage V(Reset) enters the H state to the time when the read signal voltage V(Read) enters the H state is an exposure period for one horizontal line. During this exposure period, as illustrated in parts (C) and (D) of FIG. 8, in synchronization with the on-off state of each of the first diode element PD1 and the second diode element PD2 in each of the sensor elements 33, the backlight 15 alternately switches between the ON state (illuminating) and the OFF state (not illuminating). To be more specific, when the backlight 15 is in the ON state, the first diode element PD1 is in the ON state and the second diode element PD2 is in the OFF state. On the other hand, when the backlight 15 is in the OFF state, the first diode element PD1 is in the OFF state and the second diode element PD2 is in the ON state.

For example, when the reset signal voltage V(Reset) is in the H state at timing t10, the first transistor Tr1 in the sensor element 33 is in the ON state, so that the potential VP1 (storage potential) at the connection point P1 is reset to the reset voltage Vrst that is arbitrarily set.

For the next timing period from timing t11 to timing t12, the backlight 15 is in the ON state. At this time, the first diode element PD1 is in the ON state and the second diode element PD2 is in the OFF state, so that the storage operation (charging operation) to store the electric charge for charging in the capacitor C1 is performed. As a result, the electric charge for charging is stored in the capacitor C1 through a path of a charging current I11 illustrated in FIG. 9, according to a sum of an amount of reflected light Lon, which is irradiation light emitted from the backlight 15 and reflected off the proximity object, and an amount of external light (ambient light) L0, and the storage potential VP1 rises.

At the next timing period from the timing t12 to timing t13, the backlight 15 is in the OFF state. At this time, the first diode element PD1 is in the OFF state and the second diode element PD2 is in the ON state, so that the releasing operation (discharging operation) to release the electric charge for discharging from the capacitor C1 is performed. As a result, the electric charge for discharging is released from the capacitor C1 through a path of a discharging current I12 illustrated in FIG. 10, according to an amount of the external light (ambient light) L0, and the storage potential VP1 drops.

Subsequently, switching between the storage operation for storing the electric charge for charging and the releasing operation for releasing the electric charge for discharging is made plural times before timing t14 (during the exposure period). Afterwards, the electric charge stored in the capacitor C1 during that time is read out as the detection signal (image pickup signal). Specifically, at the timing t14, the read signal voltage V(Read) enters the H state, so that the third transistor Tr3 of the sensor element 33 enters the ON state. Subsequently, during a period from timing t15 to timing t16, the voltage of the storage potential VP1 is read from the readout line 41. In this way, the detection signal is read out after the switching between the storage operation for storing the electric charge for charging and the releasing operation for releasing the electric charge for discharging is made plural times, so that the exposure period becomes longer, resulting in an increase in the signal component (storage potential VP1) of the detection signal as illustrated in Part (E) of FIG. 8. Further, the value of the image pickup signal obtained here is analog and therefore, the image pickup signal is subjected to A/D (analog-to-digital) conversion in the light-receiving drive circuit 13. Incidentally, thereafter, the reset signal voltage V(Reset) enters the H state at the timing t16, so that operation similar to the operation carried out from the timing t10 to the timing t16 is repeated.

In this way, in proximity-object detection processing in the present embodiment, when the irradiation light from the backlight 15 is emitted to the proximity object, the electric charge for charging is stored in each of the sensor elements 33 according to the sum of the amount of the reflected light resulting from the irradiation light and the amount of the ambient light (external light) L0. On the other hand, when the irradiation light is not emitted, the electric charge for discharging is released from each of the sensor elements 33 according to the amount of the ambient light L0. As a result, the detection signal (image pickup signal) is obtained from each of the sensor elements 33. Moreover, the image processing section 14 obtains the object information including at least one of the position, shape and size of the proximity object, by using the picked-up image based on the image pickup signal obtained from each of the sensor elements 33. As a result, the component resulting from the ambient light L0 is subtracted from the image pickup signal obtained from each of the sensor elements 33 and thus, it is possible to obtain the object information about the proximity object without being affected by the ambient light L0.

Figure 34:
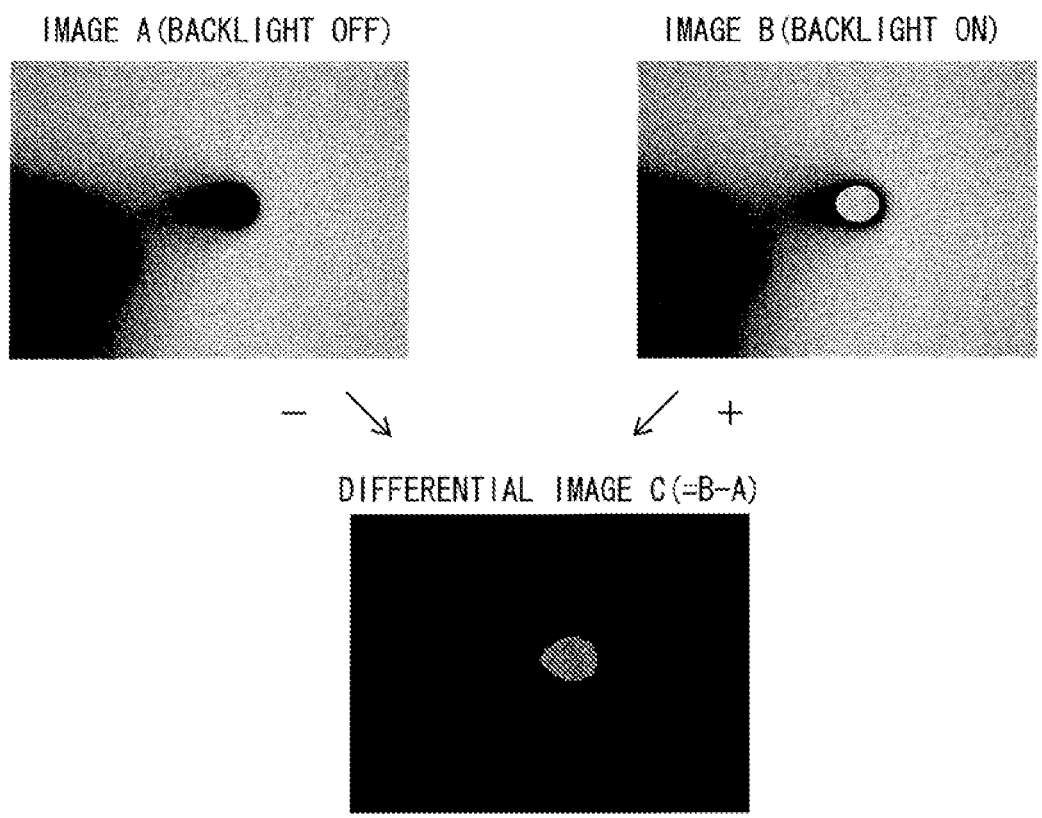
FIG. 34 shows photographs for explaining a method of detecting a proximity object by using a differential image in related art.

Furthermore, since the image pickup signal is obtained from each of the sensor elements 33 based on the storage operation for storing the electric charge for charging and the releasing operation for releasing the electric charge for discharging, the frame memory 13A for producing the picked-up image based on the image pickup signal in the light-receiving drive circuit 13 may be less than those in the past. For example, the related art illustrated in FIG. 34 has the frame memories for the two images, namely, the image obtained when the backlight is off (image A) and the image obtained when the backlight is on (image B). In contrast, the display device according to the present embodiment has the image memory for only one frame. Therefore, it is possible to stably detect an object without depending on the use situation, while suppressing the production cost.

Moreover, the object information is obtained based on the image pickup signal acquired after the switching between the storage operation for storing the electric charge for charging and the releasing operation for releasing the electric charge for discharging is made plural times and therefore, it is possible to make the exposure period long. Accordingly, it is possible to improve sensitivity by increasing the signal component (storage potential VP1) of the image pickup signal and at the same time, the exposure time may be freely set and thus, it is possible to enhance a signal-to-noise ratio.

Incidentally, in the proximity-object detection processing in the present embodiment, it is possible to not only obtain the object information about a single proximity object, but similarly obtain the object information about two or more proximity objects simultaneously placed near the display area 21 of the I/O display panel 20.

Details of controlling on-off states of diode elements PD1 and PD2

The first diode element PD1 and the second diode element PD2 in the sensor element 33 are the same in structure. However, the first diode element PD1 and the second diode element PD2 are different from each other, in terms of relationships among voltages respectively applied to the gate electrode, the cathode electrode and the anode electrode, so that the respective on-off states of the first diode element PD1 and the second diode element PD2 are controlled differently.

Figure 6A:
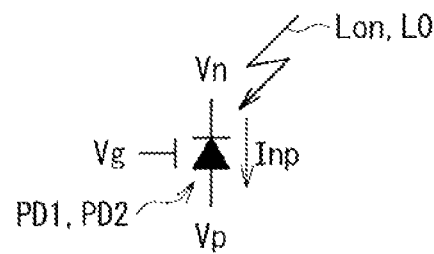
FIGS. 6A and 6B are diagrams for explaining an ON operation range and an OFF operation range in diode elements within the sensor element.
Figure 6B:
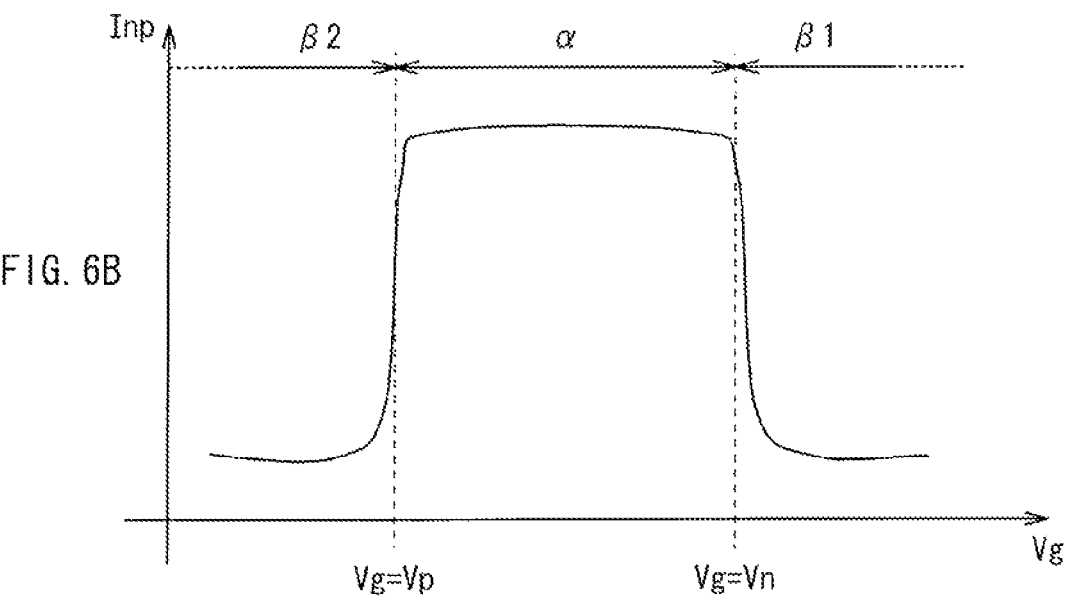

As illustrated in FIG. 6A, the anode voltage, the cathode voltage and the gate voltage of each of the first diode element PD1 and the second diode element PD2 are assumed to be Vp, Vn and Vg, respectively, and a photo current that flows from the cathode to the anode is assumed to be Inp. At this time, an I-V curve in each of the first diode element PD1 and the second diode element PD2 is expressed, for example, as illustrated in FIG. 6B. When the Vg is changed, a voltage range of Vp<Vg<Vn is an ON operation range α in which each of the first diode element PD1 and the second diode element PD2 is in the ON state. Incidentally, to be exact, upper and lower limits of the ON operation range α differ from Vn and Vp depending on conditions such as a dose in a semiconductor layer. In the present embodiment however, for the purpose of simplifying the description, the upper and lower limits are assumed to be Vn and Vp, respectively. In this case, a voltage range of Vn<Vg is a first OFF operation range β1 in which each of the first diode element PD1 and the second diode element PD2 is in the OFF state. A voltage range of Vg<Vp is a second OFF operation range β2 in which each of the first diode element PD1 and the second diode element PD2 is in the OFF state. By using such a property, a potential relationship between the cathode electrode and the gate electrode or a potential relationship between the anode electrode and the gate electrode is changed, so that the first diode element PD1 and the second diode element PD2 may be subjected to on-off control in different voltage ranges.

Figure 7A:
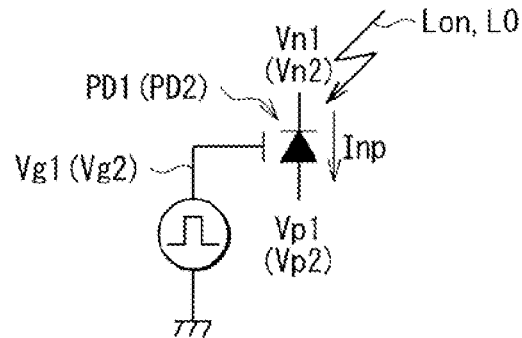
FIGS. 7A through 7C are diagrams for explaining an ON operation range and an OFF operation range in diode elements within the sensor element.
Figure 7B:
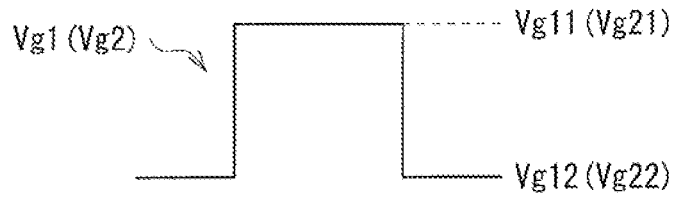
Figure 7C:
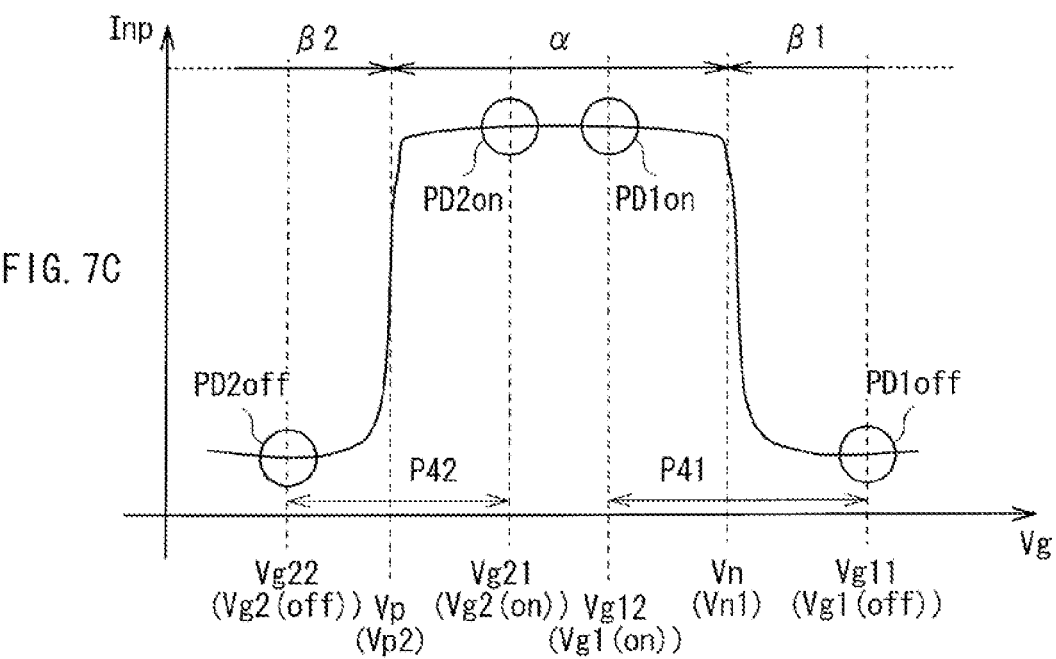

To be more specific, voltage ranges are set, for example, as illustrated in FIG. 7C. Here, as illustrated in FIG. 7A, the anode voltage, the cathode voltage and the gate voltage of the first diode element PD1 are assumed to be Vp1, Vn1 and Vg1, respectively. Also, the anode voltage, the cathode voltage and the gate voltage of the second diode element PD2 are assumed to be Vp2, Vn2 and Vg2, respectively. As the gate voltage Vg1 of the first diode element PD1, a rectangular wave in which a voltage Vg11 and a voltage Vg12 alternately change is applied as illustrated in FIG. 7B. Similarly, as the gate voltage Vg2 of the second diode element PD2, a rectangular wave in which a voltage Vg21 and a voltage Vg22 alternately change is applied.

As to the first diode element PD1, the on-off state is controlled by changing the gate voltage Vg1 in a state in which the cathode voltage Vn1 is fixed. At this time, as illustrated in a voltage range P41 in FIG. 7C, a voltage in the ON operation range α and a voltage in the first OFF operation range β1 are alternately applied as the gate voltage Vg1. In other words, the on-off state of the first diode element PD1 is controlled by using the ON operation range α and the first OFF operation range β1. When the voltage Vg11 illustrated in FIG. 7B and FIG. 7C is assumed to be a gate voltage Vg1(off) in the OFF state of the first diode element PD1, and the voltage Vg12 illustrated in FIG. 7B and FIG. 7C is assumed to be a gate voltage Vg1(on) in the ON state of the first diode element PD1, the first diode element PD1 is driven based on a potential relationship satisfying a condition (2) shown below.

$$Vg1(\text{on}) < Vn1 < Vg1(\text{off}) \quad (2)$$

As to the second diode element PD2, the on-off state is controlled by changing the gate voltage Vg2 in a state in which the anode voltage Vp2 is fixed. At this time, as illustrated in a voltage range P42 in FIG. 7C, a voltage in the ON operation range α and a voltage in the second OFF operation range β2 are alternately applied as the gate voltage Vg2. In other words, the on-off state of the second diode element PD2 is controlled by using the ON operation range α and the second OFF operation range β2. When the voltage Vg21 illustrated in FIG. 7B and FIG. 7C is assumed to be a gate voltage Vg2(on) in the ON state of the second diode element PD2, and the voltage Vg22 illustrated in FIG. 7B and FIG. 7C is assumed to be a gate voltage Vg2(off) in the OFF state of the second diode element PD2, the second diode element PD2 is driven based on a potential relationship satisfying a condition (1) shown below.

$$Vg2(\text{off}) < Vp2 < Vg2(\text{on}) \quad (1)$$

Operation by Overdrive

As described above, according to the present embodiment, in the sensor element 33, the first diode element PD1 and the second diode element PD2 are subjected to the on-off control in the different voltage ranges, and the charging operation and the discharging operation are alternately repeated, so that the proximity object is detected. In this case, as will be described below, when there is a difference in response characteristic (transient response) between the first diode element PD1 and the second diode element PD2, it is difficult to perform satisfactory detection operation. In order to improve this situation, it is desirable to employ overdrive when the first diode element PD1 and the second diode element PD2 are driven.

Figure 11A:
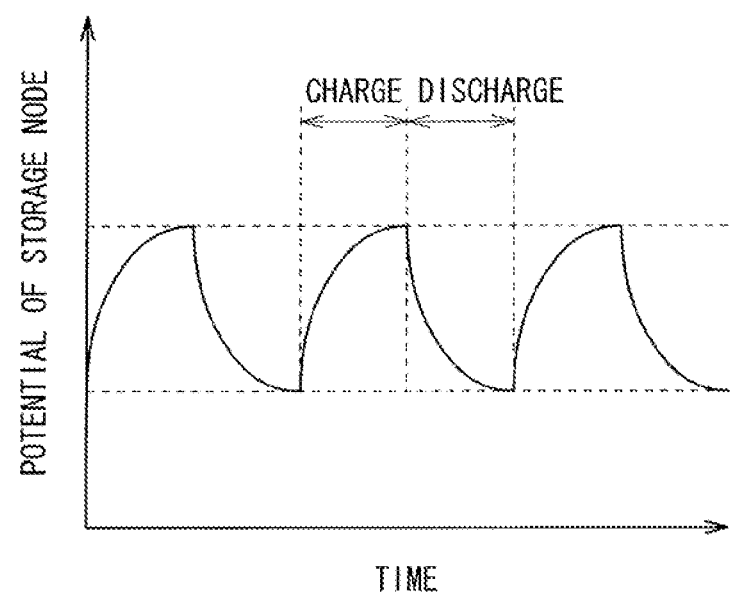
FIGS. 11A and 11B are waveform diagrams that illustrate a voltage waveform of a storage node obtained when two diode elements operate in an ideal state, and an actual voltage waveform of the storage node obtained when a difference in response characteristic between the two diode elements is considered, respectively.

First, a disadvantage that occurs when the overdrive is not employed will be described with reference to FIG. 11A through FIG. 14B. FIG. 11A illustrates a voltage waveform of the storage node (connection point P1 in FIG. 5) obtained when the first diode element PD1 and the second diode element PD2 operate in an ideal state in the sensor element 33. Incidentally, FIG. 11A illustrates the voltage waveform when the reflected light Lon from the proximity object is absent. In the proximity-object detection processing in the present embodiment, the electric charge for charging is stored in the sensor element 33 according to the sum of the amount of the reflected light Lon resulting from the irradiation light and the amount of the ambient light (external light) L0, when the irradiation light is emitted from the backlight 15 to the proximity object as illustrated in FIG. 9. In contrast, when the irradiation light is not emitted as illustrated in FIG. 10, the electric charge for discharging is released from the sensor elements 33 according to the amount of the ambient light L0. Thus, the component resulting from the ambient light L0 is subtracted in the state after the charging operation and the discharging operation are completed and therefore, only a voltage according to the reflected light Lon from the proximity object is detected as a difference. Accordingly, when the reflected light Lon is absent, the voltage obtained as the difference in the state after the charging operation and the discharging operation are completed once is, theoretically, zero. In this case, in theory, the voltage of the storage node ideally takes, as illustrated in FIG. 11A, a waveform in which a charged quantity resulting from the charging operation and a discharged quantity resulting from the discharging operation are equal.

Figure 11B:
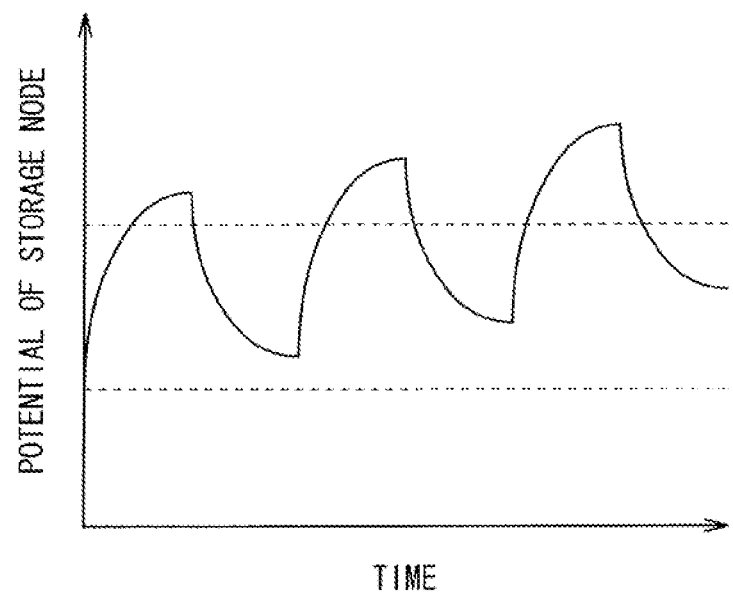

In contrast, FIG. 11B illustrates an actual voltage waveform of the storage node when a difference in response characteristic between the first diode element PD1 and the second diode element PD2 is taken into consideration. Like FIG. 11A, FIG. 11B illustrates the voltage waveform when the reflected light Lon resulting from the irradiation light is absent. Even though the reflected light Lon is absent, charging is caused at the storage node when the charging operation and the discharging operation are repeated, thereby gradually increasing the voltage. This means that the charging capability of the first diode element PD1 is superior to the discharging capability of the second diode element PD2 and the charging takes place at the storage node as a whole. Such a state causes a malfunction of the sensor element 33, which is not desirable.

Figure 12A:
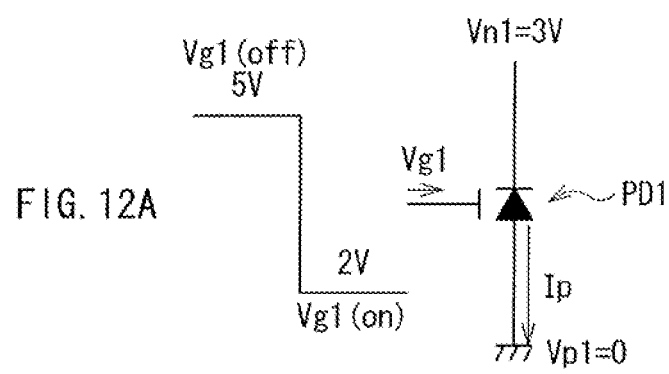
FIGS. 12A and 12B are diagrams that illustrate an example of a voltage value applied to a first diode element and an example of a voltage value applied to a second diode element, respectively.
Figure 12B:
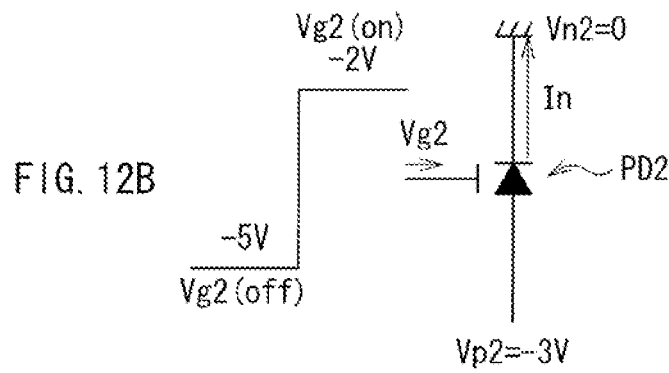
Figure 13:
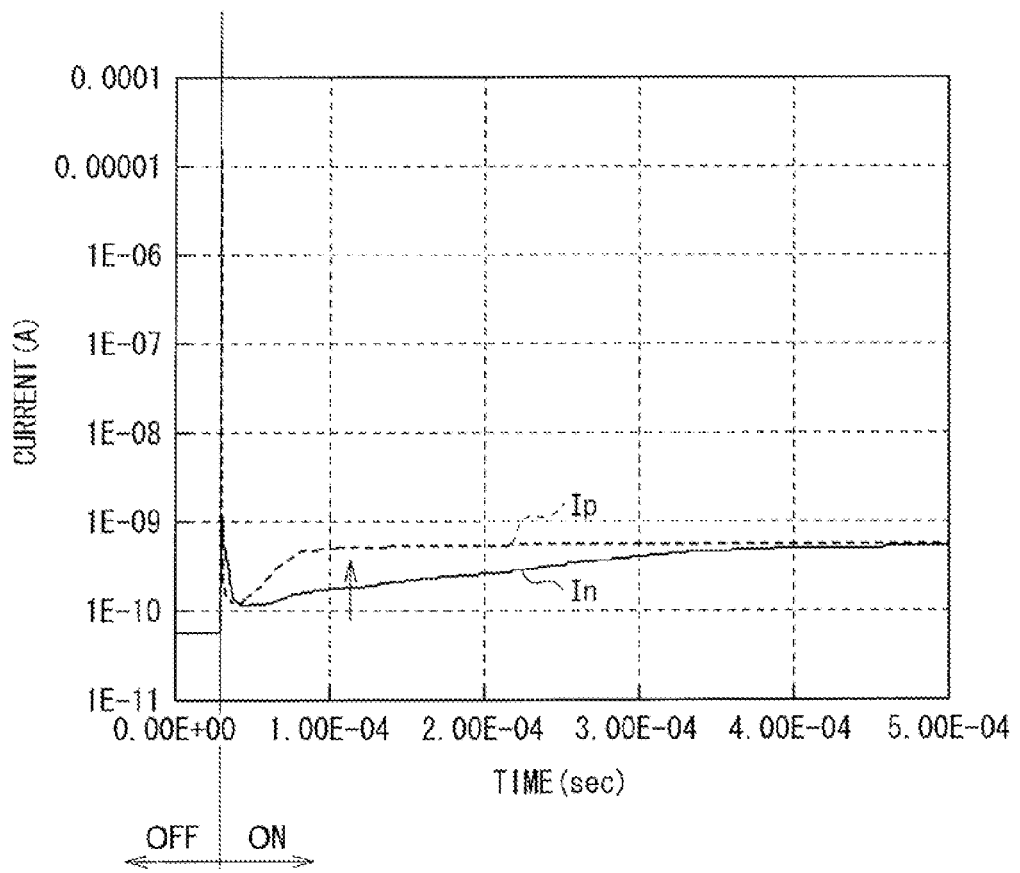
FIG. 13 is a characteristic diagram that illustrates a comparison between an anode current Ip that flows in the first diode element and a cathode current In that flows in the second diode element.

Here, there will be discussed why a difference in charging and discharging capability between the first diode element PD1 and the second diode element PD2 is caused. FIG. 13 illustrates a comparison between an anode current Ip that flows in the first diode element PD1 and a cathode current In that flows in the second diode element PD2. FIG. 13 shows a characteristic per element when the first diode element PD1 and the second diode element PD2 are driven based on voltage values shown in FIG. 12A and FIG. 12B. In other words, for the first diode element PD1, as illustrated in FIG. 12A, the anode voltage Vp1 is assumed to be 0, the cathode voltage Vn1 is assumed to be a fixed voltage of 3V, the gate voltage at the ON time Vg1(on) is assumed to be 2V, and the gate voltage at the OFF time Vg1(off) is assumed to be 5V. For the second diode element PD2, as illustrated in FIG. 12B, the cathode voltage Vn2 is assumed to be 0, the anode voltage Vp2 is assumed to be a fixed voltage of −3V, the gate voltage at the ON time Vg2(on) is assumed to be −2V, and the gate voltage at the OFF time Vg2(off) is assumed to be −5V.

As apparent from FIG. 13, the anode current Ip that flows in the first diode element PD1 saturates faster than (has a current time constant smaller than that of) the cathode current In that flows in the second diode element PD2. Thus, a charged capacity of the first diode element PD1 is greater than a discharged capacity of the second diode element PD2.

Figure 14A:
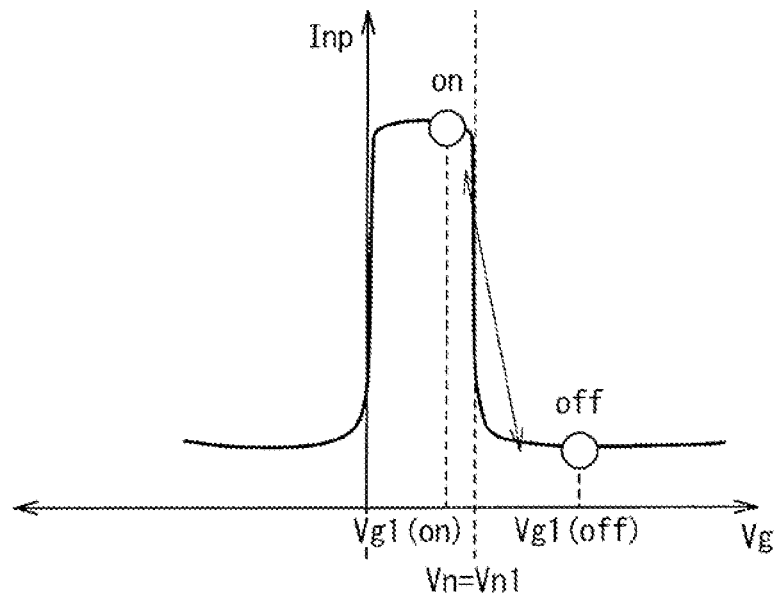
FIGS. 14A and 14B are explanatory diagrams that illustrate operating points in on-off control of the first diode element and operating points in on-off control of the second diode element, respectively, when the diode elements are subjected to the on-off control without overdrive.

FIG. 14A illustrates on and off operating points per element when the first diode element PD1 is subjected to the on-off control in the voltage state shown in FIG. 12A. FIG. 14A shows an I-V curve of the first diode element PD1. As described with reference to FIG. 7C, the gate voltage Vg1(on) at the ON time, the gate voltage Vg1(off) at the OFF time, and the cathode voltage Vn1 that is the fixed voltage of the first diode element PD1 are related to one another based on the following condition (2).

$$Vg1(\text{on}) < Vn1 < Vg1(\text{off}) \tag{2}$$

In this case, at the first diode element PD1, the voltage Vg1(off) in the relationship satisfying the above condition (2) is applied to the gate electrode at the OFF time so that electrons are collected at a channel (mainly in the i region in the case of the PIN photodiode), thereby optical carriers are terminated. At the ON time, the voltage Vg1(on) in the relationship satisfying the above condition (2) is applied to the gate electrode so that the channel is depleted, which brings about a state in which the optical carriers are efficiently taken out.

Figure 14B:
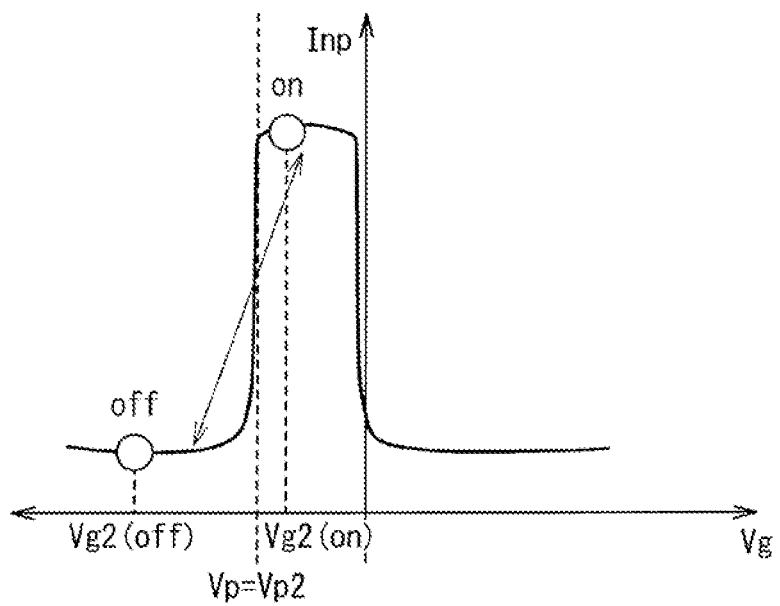

FIG. 14B illustrates on and off operating points per element when the second diode element PD2 is subjected to the on-off control in the voltage state shown in FIG. 12B. FIG. 14B shows an I-V curve of the second diode element PD2. As described with reference to FIG. 7C, the gate voltage Vg2(on) at the ON time, the gate voltage Vg2(off) at the OFF time, and the anode voltage Vp2 that is the fixed voltage of the second diode element PD2 are related to one another based on the following condition (1).

$$Vg2(\text{off}) < Vp2 < Vg2(\text{on}) \tag{1}$$

In this case, at the second diode element PD2, the voltage Vg2(off) in the relationship satisfying the above condition (1) is applied to the gate electrode at the OFF time so that positive holes are collected at a channel (mainly in the i region in the case of the PIN photodiode), thereby optical carriers are terminated. At the ON time, the voltage Vg2(on) in the relationship satisfying the above condition (1) is applied to the gate electrode so that the channel is depleted, which brings about a state in which the optical carriers are efficiently taken out.

In this way, the first diode element PD1 and the second diode element PD2 are subjected to the on-off control in different voltage ranges, and thus are different in carriers collected at the OFF time. In other words, the first diode element PD1 makes the electrons serve as carriers, while the second diode element PD2 makes the positive holes serve as carriers. In contrast, when switching from the OFF state to the ON state, there is a relationship as shown below.

Time before channel is depleted)=(Time before carriers collected at OFF time are terminated Accordingly, since the types of carrier collected at the OFF time are different and thus the times before depletion are different, a difference in response characteristic from the OFF state to the ON state takes place.

Figure 15A:
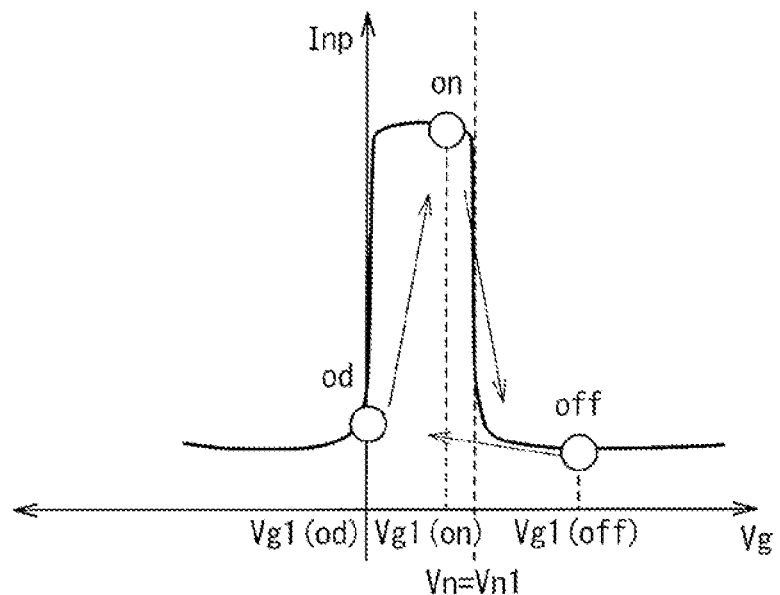
FIGS. 15A and 15B are explanatory diagrams that illustrate operating points in on-off control of the first diode element and operating points in on-off control of the second diode element, respectively, when the diode elements are subjected to the on-off control with the overdrive.
Figure 15B:
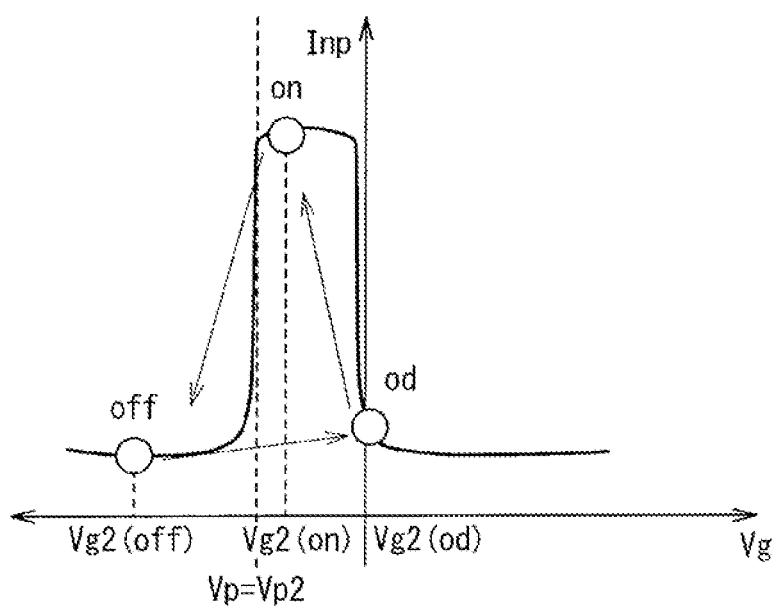

The disadvantage described above may be addressed by performing the overdrive as shown in FIG. 15A and FIG. 15B.

FIG. 15A illustrates on and off operating points per element, when the first diode element PD1 is subjected to the on-off control in the voltage state shown in FIG. 12A and undergoes the overdrive. FIG. 15A shows an I-V curve of the first diode element PD1. The overdrive of the first diode element PD1 is performed by temporarily applying a gate voltage Vg1(od) in a potential relationship satisfying a condition (2A) shown below to the gate electrode of the first diode element PD1, when shifting from the OFF state to the ON state.

$$Vg1(od) < Vg1(on) \quad (2A)$$

To be more specific, when the on-off control is carried out in, for example, the voltage state shown in FIG. 12A, it is desirable that the gate voltage Vg1(od) applied at the time of the overdrive be, for example, in the neighborhood of 0V. Further, assuming that switching between the ON state and the OFF state is carried out in a cycle of some tens of microseconds, a duration of the overdrive is preferably about 1-10 μ sec. and more preferably about 4-6 μ sec. Incidentally, the characteristic in an ON operation range of the first diode element PD1 shifts depending on conditions such as a dose in a semiconductor layer. A voltage value suitable for serving as the gate voltage Vg1(od) at the time of the overdrive is set as appropriate according to the operation range of the element.

In this case, in the first diode element PD1, the voltage Vg1(off) in the relationship satisfying the above condition (2) is applied to the gate electrode at the OFF time, so that electrons are collected at a channel (mainly in the i region in the case of the PIN photodiode), thereby optical carriers are terminated. Subsequently, the voltage Vg1(od) in the relationship satisfying the above condition (2A) is applied as an overdrive voltage, so that the electrons collected at the channel are terminated (a state in which the electrons do not easily gather is brought about). After this overdrive voltage is applied, the voltage Vg1(on) at the ON time in the relationship satisfying the above condition (2) is applied to the gate electrode so that the channel is depleted, which brings about a state in which the optical carriers are efficiently taken out.

FIG. 15B illustrates on and off operating points per element, when the second diode element PD2 is subjected to the on-off control in the voltage state shown in FIG. 12B and undergoes the overdrive. FIG. 15B shows an I-V curve of the second diode element PD2. The overdrive of the second diode element PD2 is performed by temporarily applying a gate voltage Vg2(od) in a potential relationship satisfying a condition (1A) shown below to the gate electrode of the second diode element PD2, when shifting from the OFF state to the ON state.

$$Vg2(on) < Vg2(od) \quad (1A)$$

To be more specific, when the on-off control is carried out in, for example, the voltage state shown in FIG. 12B, it is desirable that the gate voltage Vg2(od) applied at the time of the overdrive be, for example, in the neighborhood of 0V. Further, assuming that switching between the ON state and the OFF state is carried out in a cycle of some tens of microseconds, a duration of the overdrive is preferably about 1-10 μ sec. and more preferably about 4-6 μ sec. Incidentally, the characteristic in an ON operation range of the second diode element PD2 shifts depending on conditions such as a dose in a semiconductor layer. A voltage value suitable for serving as the gate voltage Vg2(od) at the time of the overdrive is set as appropriate according to the operation range of the element.

In this case, in the second diode element PD2, the voltage Vg2(off) in the relationship satisfying the above condition (1) is applied to the gate electrode at the OFF time, so that positive holes are collected at a channel (mainly in the i region in the case of the PIN photodiode), thereby optical carriers are terminated. Subsequently, the voltage Vg2(od) in the relationship satisfying the above condition (1A) is applied as an overdrive voltage, so that the positive holes collected at the channel are terminated (a state in which the positive holes do not easily gather is brought about). After this overdrive voltage is applied, the voltage Vg2(on) in the relationship satisfying the above condition (1) is applied to the gate electrode so that the channel is depleted, which brings about a state in which the optical carriers are efficiently taken out.

In this way, by performing the overdrive at the time of shifting from the OFF state to the ON state, the time to terminate the carriers (electrons or positive holes) is made. By doing so, the time constant before the channel is depleted may be reduced. As a result, the response characteristic at the time of shifting from the OFF state to the ON state is improved.

Incidentally, the response characteristic on a discharging side (second diode element PD2) is inferior to (has a larger time constant than) that on a charging side (first diode element PD1) and therefore, it is desirable that at least the second diode element PD2 be subjected to the overdrive.

Concrete Example of Overdrive

FIG. 16A through FIG. 16C illustrate concrete examples of the voltage value applied to the first diode element PD1 when a shift from the OFF state to the ON state takes place. In particular, FIG. 16A illustrates an example in which the overdrive is not performed. Further, FIG. 16B illustrates a first example in which the overdrive is performed, and FIG. 16C illustrates a second example in which the overdrive is performed. In the driving example illustrated in FIG. 16A, like the voltage state illustrated in FIG. 12A, the anode voltage Vp1 is assumed to be 0, the cathode voltage Vn1 is assumed to be 3V, the gate voltage at the ON time Vg1(on) is assumed to be 2V, and the gate voltage at the OFF time Vg1(on) is assumed to be 5V. In the first example of the overdrive illustrated in FIG. 16B, when there is a shift from the OFF state to the ON state, the gate voltage Vg1(od) of 0V is applied. In the second example of the overdrive illustrated in FIG. 16C, when there is a shift from the OFF state to the ON state, the gate voltage Vg1(od) of −0.5V is applied.

FIG. 17A through FIG. 17C illustrate concrete examples of the voltage value applied to the second diode element PD2 when a shift from the OFF state to the ON state takes place. In particular, FIG. 17A illustrates an example in which the overdrive is not performed. Further, FIG. 17B illustrates a first example in which the overdrive is performed, and FIG. 17C illustrates a second example in which the overdrive is performed. In the driving example illustrated in FIG. 17A, like the voltage state illustrated in FIG. 12B, the anode voltage Vp2 is assumed to be −3V, the cathode voltage Vn2 is assumed to be 0, the gate voltage at the ON time Vg2(on) is assumed to be −2V, and the gate voltage at the OFF time Vg2(on) is assumed to be −5V. In the first example of the overdrive illustrated in FIG. 17B, when there is a shift from the OFF state to the ON state, the gate voltage Vg2(od) of 0V is applied. In the second example of the overdrive illustrated in FIG. 17C, when there is a shift from the OFF state to the ON state, the gate voltage Vg2(od) of 0.5V is applied.

Figure 18A:
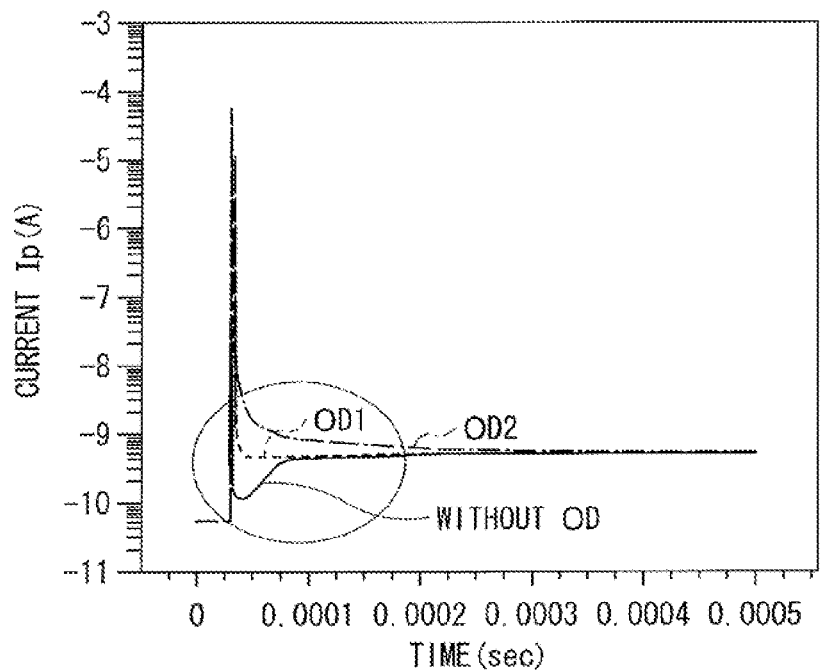
FIGS. 18A and 18B are characteristic diagrams that illustrate the anode current Ip that flows in the first diode element when the driving examples in FIG. 16A through FIG. 16C are compared with one another, and the cathode current In that flows in the second diode element when the driving examples in FIG. 17A through FIG. 17C are compared with one another.

FIG. 18A shows the anode current Ip that flows in the first diode element PD1 when the driving examples in FIG. 16A through FIG. 16C are compared with one another. In FIG. 18A, a curve indicated by "WITHOUT OD" corresponds to the driving example in FIG. 16A. A curve indicated by "OD1" corresponds to the first example of the overdrive in FIG. 16B, and a curve indicated by "OD2" corresponds to the second example of the overdrive in FIG. 16C.

Figure 18B:
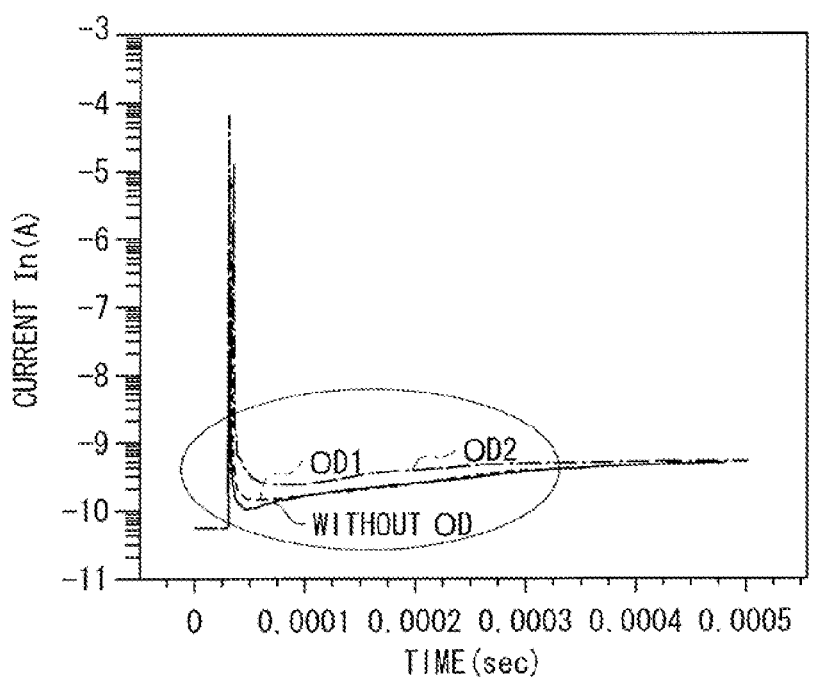

FIG. 18B shows the cathode current In that flows in the second diode element PD2 when the driving examples in FIG. 17A through FIG. 17C are compared with one another. In FIG. 18B, a curve indicated by "WITHOUT OD" corresponds to the driving example in FIG. 17A. A curve indicated by "OD1" corresponds to the first example of the overdrive in FIG. 17B, and a curve indicated by "OD2" corresponds to the second example of the overdrive in FIG. 17C.

As apparent from FIGS. 18A and 18B, in both the first diode element PD1 and the second diode element PD2, the current-saturating speed when the overdrive is performed is higher (the current time constant is smaller) than that when the overdrive is not performed. By using this characteristic, the gate voltages Vg1(od) and Vg2(od) applied when the overdrive is performed are appropriately adjusted, so that a difference between the first diode element PD1 and the second diode element PD2 in terms of response characteristic (transient response) is suppressed and thereby the characteristics may be made uniform. When the response characteristics to serve as a diode at the time of charging operation and at the time of discharging operation are made uniform, in a case in which the sensor element 33 in FIG. 5 is employed, it is possible to sufficiently subtract the component due to the ambient light L0 and therefore satisfactory signal detection may be carried out.

Here, the driving examples illustrated in FIG. 16A through FIG. 17C and the current characteristics illustrated in FIG. 18A and FIG. 18B are the driving examples and the characteristics when each of the first diode element PD1 and the second diode element PD2 is considered as a single element. Therefore, subsequently, driving examples in a state in which the first diode element PD1 and the second diode element PD2 are connected to each other will be described.

Figure 19:
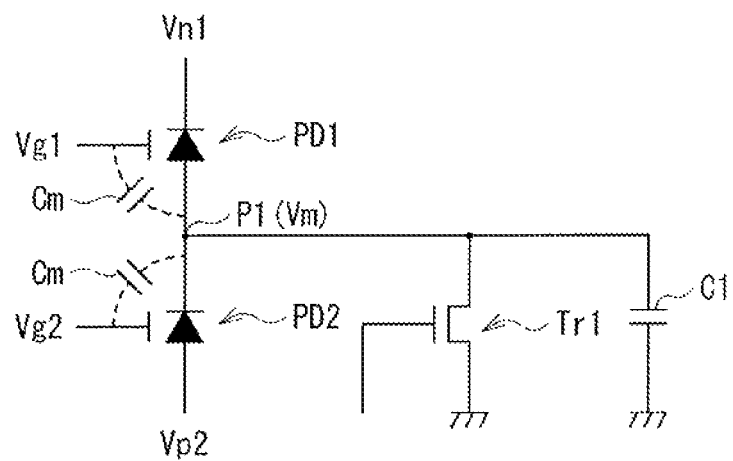
FIG. 19 is a circuit diagram that illustrates a configuration of the sensor element for simulation.
Figure 20:
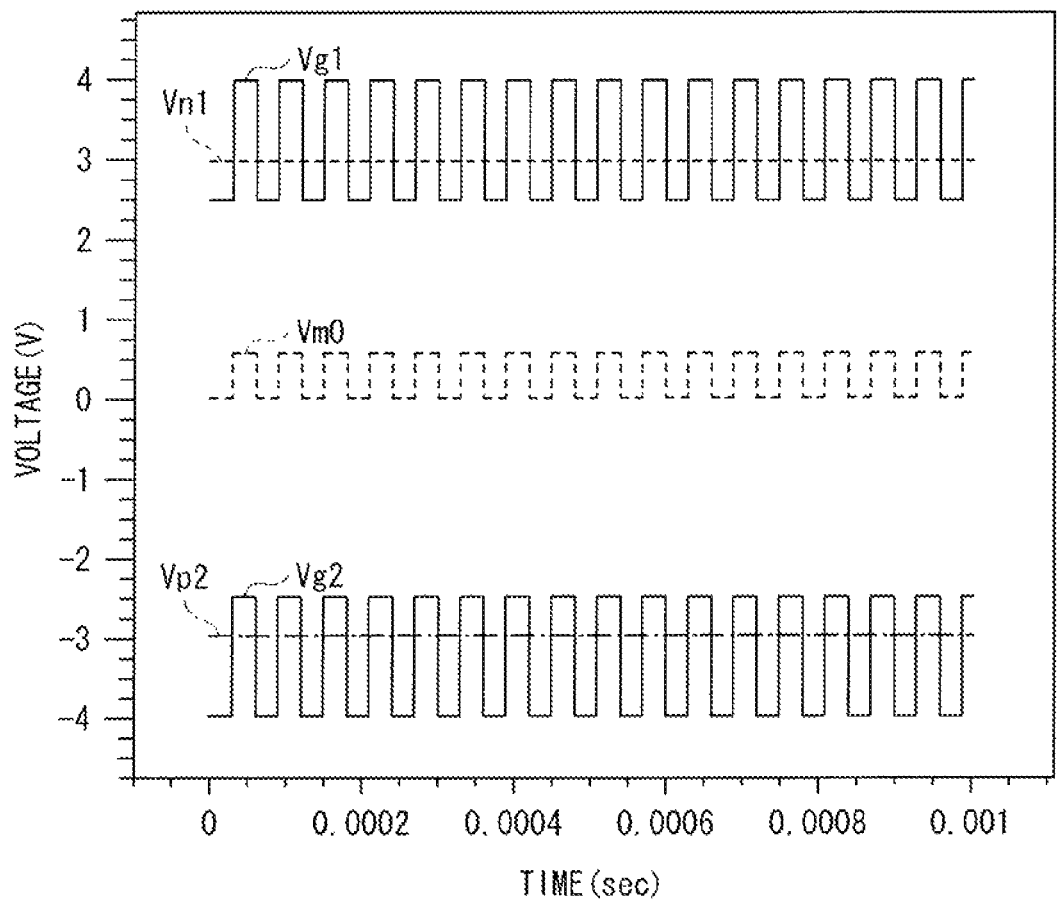
FIG. 20 is a waveform diagram that illustrates an example of an operating voltage of each part when the circuit depicted in FIG. 19 is operated without the overdrive.
Figure 21:
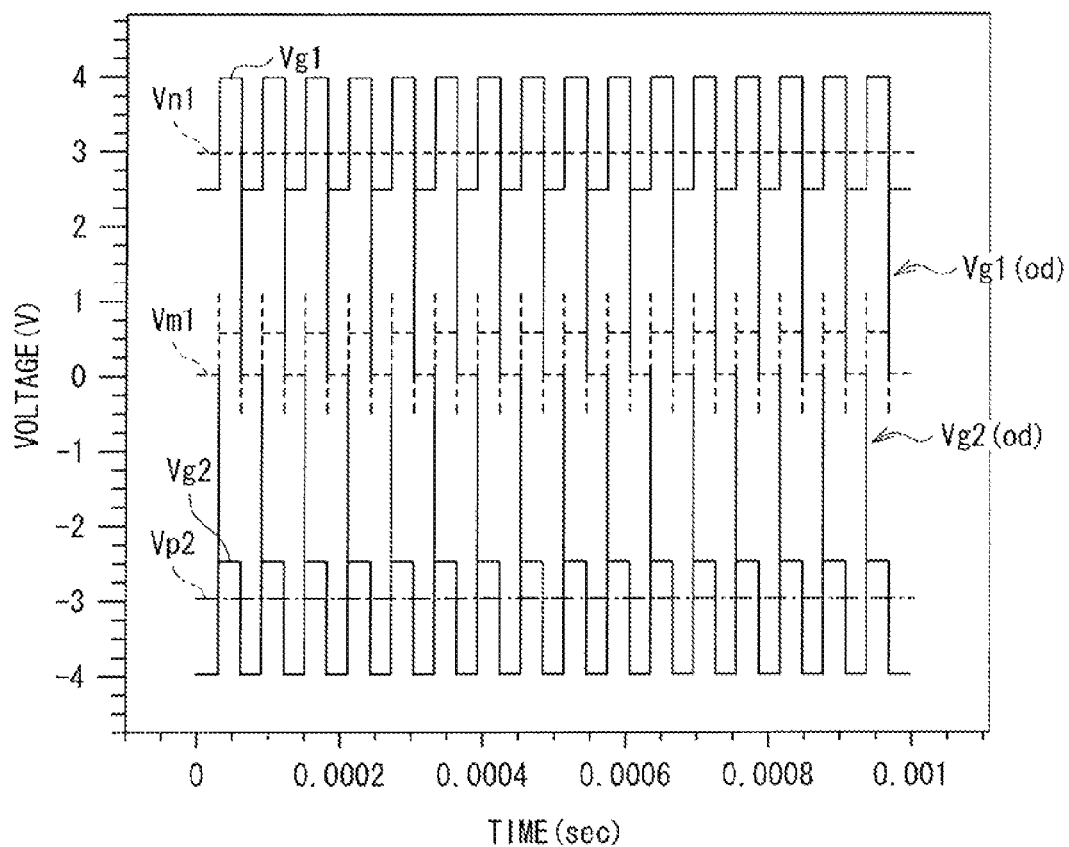
FIG. 21 is a waveform diagram that illustrates an example of an operating voltage of each part when the circuit depicted in FIG. 19 is operated with the overdrive.

FIG. 19 illustrates an example of a circuit in which the first diode element PD1 and the second diode element PD2 are connected to each other. FIG. 20 and FIG. 21 illustrate simulations of a waveform representing a storage voltage Vm at the connection point (storage node) P1 between the first diode element PD1 and the second diode element PD2 in the configuration of the circuit in FIG. 19. In particular, FIG. 20 illustrates the storage voltage Vm (Vm0) when the circuit illustrated in FIG. 19 is driven without the overdrive, whereas FIG. 21 illustrates the storage voltage Vm (Vm1) when the circuit illustrated in FIG. 19 is subjected to the overdrive. In FIG. 21, 0V is applied as each of the gate voltages Vg1(od) and Vg2(od) of the overdrive.

FIG. 22 illustrates a comparison between the waveform of the storage voltage Vm0 illustrated in FIG. 20 and the waveform of the storage voltage Vm1 illustrated in FIG. 21 when these waveforms are enlarged. In the circuit of FIG. 19, a coupling capacitance Cm is produced at each of the first diode element PD1 and the second diode element PD2. In FIG. 20 and FIG. 21, each of the storage voltages Vm0 and Vm1 appears to be a simple rectangular waveform composed of high levels and low levels. Actually however, on a rectangular wave representing the coupling capacitance Cm, the charging and discharging waveform as illustrated in FIG. 11A and FIG. 11B is superimposed. Further, this charging and discharging waveform being superimposed is, like the case described with reference to FIG. 11A and FIG. 11B, a waveform when the reflected light Lon from the proximity object is absent. As apparent from FIG. 22, in the waveform representing the storage voltage Vm0 of the driving example in FIG. 20, like the case illustrated in FIG. 11B, the charging takes place at the storage node when the charging operation and the discharging operation are repeated, resulting in a gradual increase in the voltage. In contrast, in the waveform representing the storage voltage Vm1 in the case of the overdrive in FIG. 21, the voltage having a waveform close to the ideal charging and discharging waveform illustrated in FIG. 11A is superimposed and thus, the voltage value is stable.

In this way, in the display device with the input function according to the present embodiment, when the on-off state of each of the two diode elements PD1 and the second diode element PD2 is controlled, an appropriate gate voltage that suppresses a difference between diode elements in terms of response characteristic is applied. Accordingly, it is possible to suppress a difference in response characteristic between the first diode element PD1 and the second diode element PD2, thereby performing stable detection operation.

Examples of Executing Application Program

Next, with reference to FIG. 23A through FIG. 26, there will be described some examples of executing an application program by the application-program executing section 11, in which the positional information and the like of the object detected by the proximity-object detection processing described above are used.

Figure 23A:
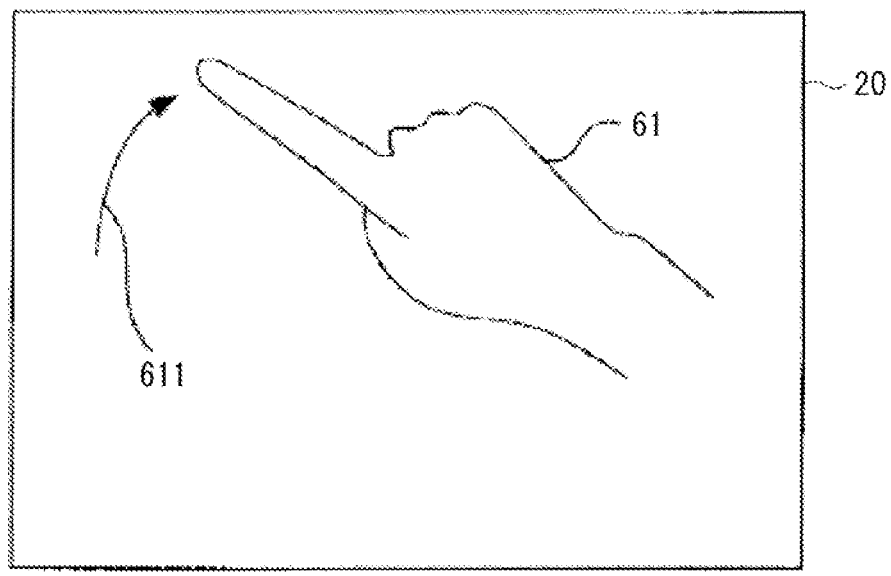
FIGS. 23A and 23B are explanatory diagrams that illustrate a first example and a second example, respectively, of executing an application program by using a result of the proximity-object detection processing in the display device illustrated in FIG. 1.

A first example illustrated in FIG. 23A is an example in which the surface of the I/O display panel 20 is touched by a finger tip 61, and a trail of touched points is displayed on the surface as a drawn line 611.

Figure 23B:
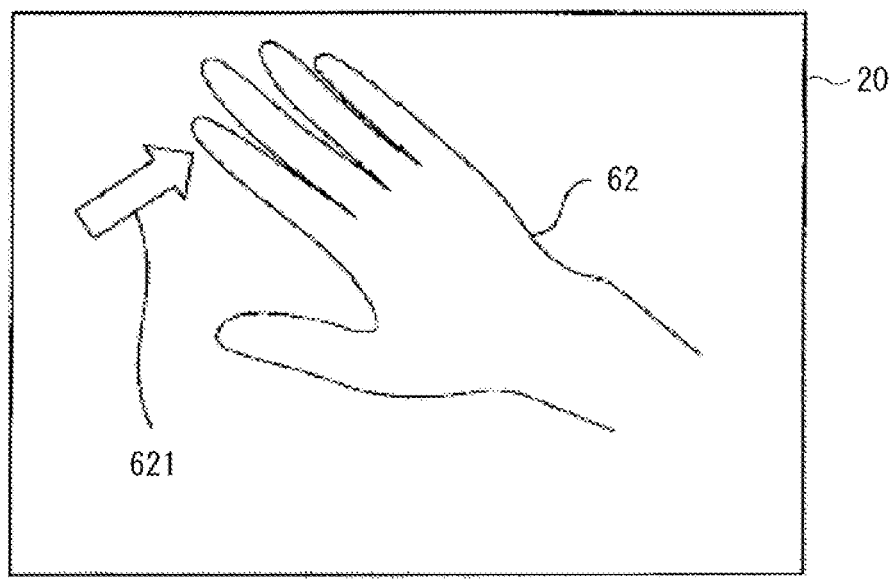

A second example illustrated in FIG. 23B is an example in which a gesture by using the shape of a hand is recognized. Specifically, the shape of a hand 62 touching (or near) the I/O display panel 20 is recognized, the recognized shape of the hand is displayed as a displayed object, and a movement 621 of the displayed object is used to carry out some processing.

Figure 24:
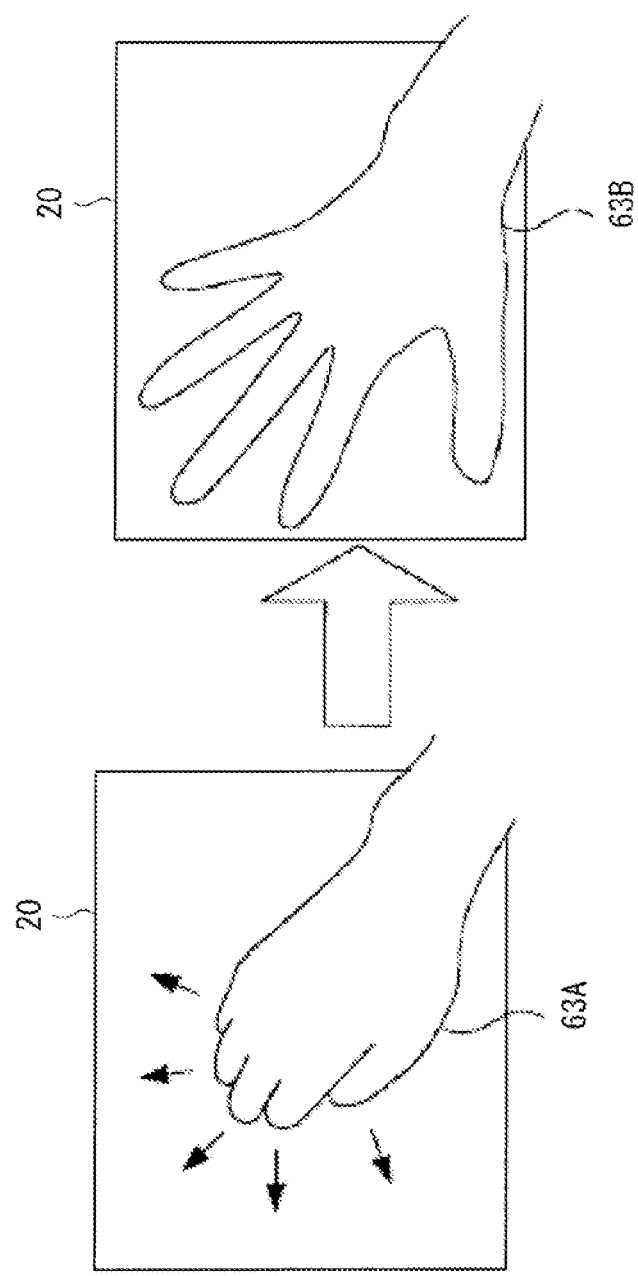
FIG. 24 is an explanatory diagram that illustrates a third example of executing an application program by using a result of the proximity-object detection processing.

A third example illustrated in FIG. 24 is an example in which a closed hand 63A is changed to an open hand 63B, image recognition of a touch or an approach of each hand is performed by the I/O display panel 20, and processing based on the image recognition is executed. Through the processing based on the image recognition, it is possible to give a direction such as zooming in. In addition, since it is possible to give such a direction, when, for example, the I/O display panel 20 is connected to a personal computer, input through manipulation of switching commands on the personal computer may be replaced by input through the image recognition and thus, directions may be input more naturally.

Figure 25:
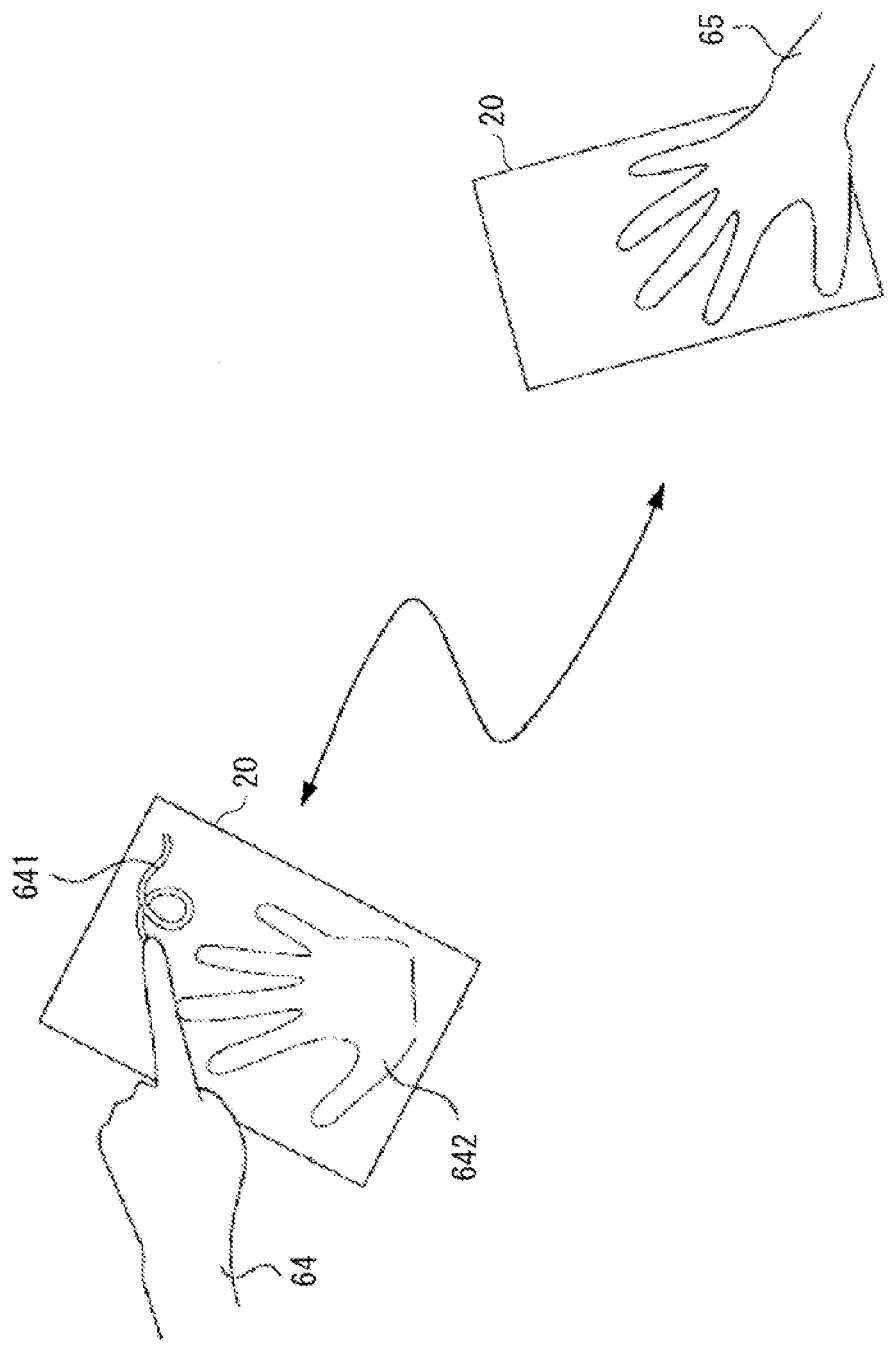
FIG. 25 is an explanatory diagram that illustrates a fourth example of executing an application program by using a result of the proximity-object detection processing.

A fourth example illustrated in FIG. 25 is an example in which two I/O display panels 20 are prepared and connected to each other by some transmission means. In this structure, an image obtained by detecting a touch on or an approach to one of the I/O display panels 20 may be transmitted to and then displayed by the other of the I/O display panels 20, and users operating the respective I/O display panels 20 may communicate with each other. For example, as illustrated in FIG. 25, it is possible to perform such processing that one of the I/O display panels 20 is caused to obtain an image of the shape of a hand 65 through image recognition and transmit the obtained image to the other of the I/O display panels 20 that in tern is caused to display a hand shape 642 identical to the shape of the hand 65. It is also possible to perform processing such as causing a trail 641 displayed as a result of a touch by a hand 64 on the other of the I/O display panels 20 to be transmitted to and then displayed by the one of the I/O display panels 20. In this way, a state of drawing is transmitted as a moving image and handwritten characters or graphics are sent to a counterpart, which creates a possibility that the I/O display panel 20 may become a new communication tool. For instance, the I/O display panel 20 may be applied to a display panel of a portable telephone. Incidentally, FIG. 25 illustrates the example in which two I/O display panels 20 are prepared, but it is possible to perform similar processing by connecting three or more I/O display panels 20 to one another with a transmission means.

Figure 26:
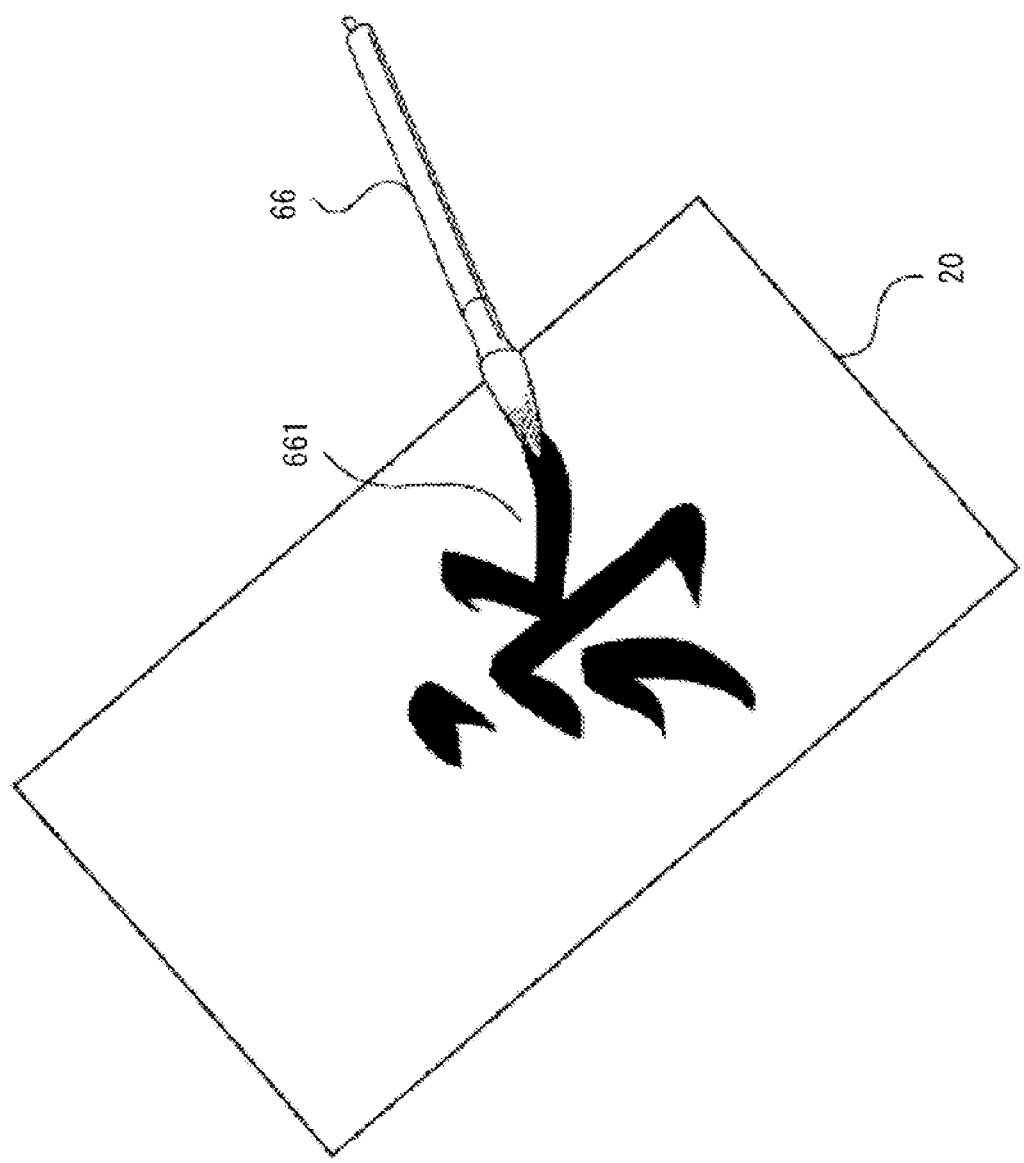
FIG. 26 is an explanatory diagram that illustrates a fifth example of executing an application program by using a result of the proximity-object detection processing.

Further, as illustrated in a fifth example of FIG. 26, a writing brush 66 is used to write a character on the surface of the I/O display panel 20 by being caused to touch the surface of the I/O display panel 20, and points touched by the writing brush 66 are displayed as an image 661 on the I/O display panel 20 and thus, input of handwriting by the writing brush is made possible. In this case, it is possible to recognize and realize even faint touches of the writing brush. In a case of recognition of handwriting in the past, for example, inclinations of a special pen are realized by electric-field detection in a part of a digitizer. However, in the present example, a surface touched by the real writing brush is detected and thus, information is input with a more realistic feeling.

MODULE AND APPLICATION EXAMPLES

Next, with reference to FIG. 27 through FIG. 31G, there will be described application examples of the display device with the input function described above. This display device is applicable to electronic units in all fields, which display externally-input video signals or internally-generated video signals as still or moving images. For example, the display device is applicable to electronic units such as television receivers, digital cameras, laptop computers, portable terminal devices such as portable telephones, and video cameras.

Application Example 1

Figure 27:
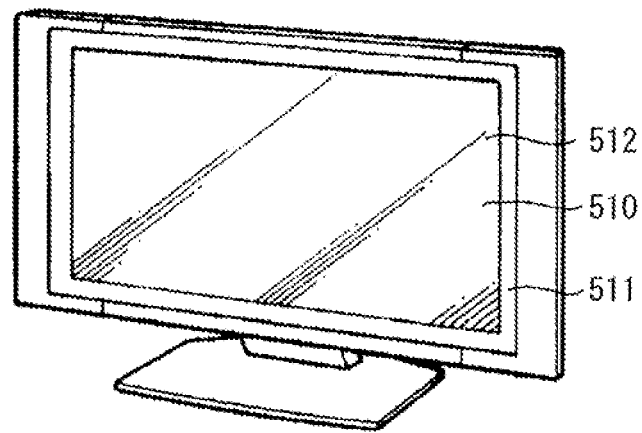
FIG. 27 is a perspective external view of a first application example of the display device illustrated in FIG. 1.

FIG. 27 illustrates an external view of a television receiver serving as a first example of the electronic units. This television receiver has, for example, a video display screen section 510 that includes a front panel 511 and a filter glass 512. The display device with the input function described above is applicable to the video display screen section 510 of this television receiver.

Application Example 2

Figure 28A:
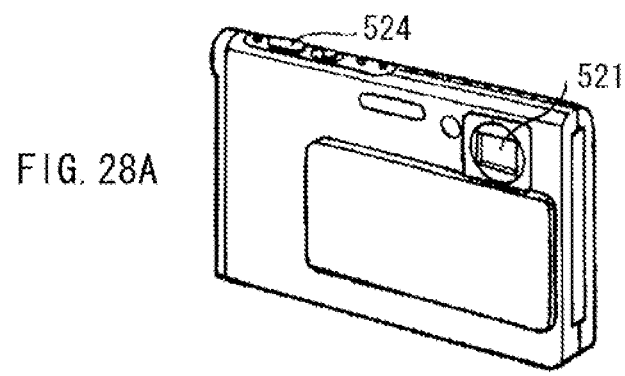
FIGS. 28A and 28B are perspective external views of a second application example, when viewed from the front and the back, respectively.
Figure 28B:
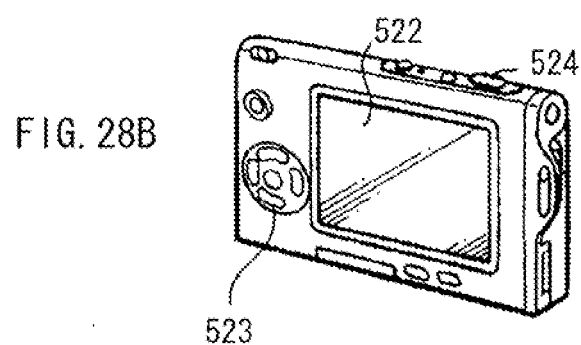

FIGS. 28A and 28B are external views of a digital camera serving as a second example of the electronic units. This digital camera includes, for example, a flash emitting section 521, a display section 522, a menu switch 523, and a shutter release button 524. The display device with the input function described above is applicable to the display section 522 of this digital camera.

Application Example 3

Figure 29:
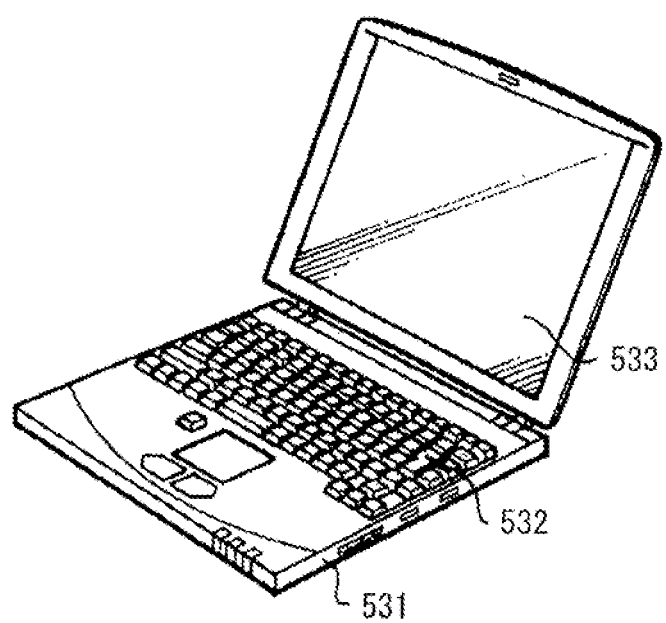
FIG. 29 is a perspective external view of a third application example.

FIG. 29 is an external view of a laptop computer serving as a third example of the electronic units. This laptop computer includes, for example, a main section 531, a keyboard 532 used to enter characters and the like, and a display section 533 that displays an image. The display device with the input function described above is applicable to the display section 533 of this laptop computer.

Application Example 4

Figure 30:
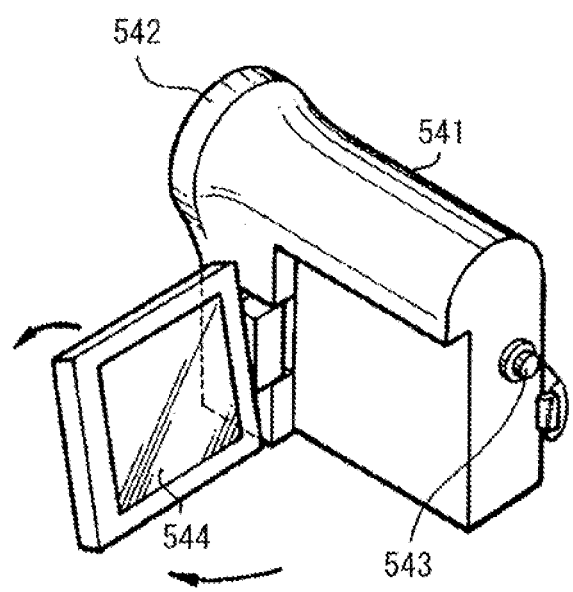
FIG. 30 is a perspective external view of a fourth application example.

FIG. 30 is an external view of a video camera serving as a fourth example of the electronic units. This video camera includes, for example, a main section 541, a lens 542 disposed on a front face of the main unit 541 to shoot an image of a subject, a start/stop switch 543 used at the time of shooting, and a display section 544. The display device with the input function described above is applicable to the display section 544 of this video camera.

Application Example 5

FIGS. 31A through 31G are external views of a portable telephone serving as a fifth example of the electronic units. This portable telephone includes, for example, an upper housing 710, a lower housing 720, a coupling section (hinge section) 731 that couples the upper and lower housings 710 and 720 to each other, a display 740, a sub-display 750, a picture light 760, and a camera 770. The display device with the input function described above is applicable to the display 740 or the sub-display 750 of this portable telephone.

Other Embodiments

The present application may be modified and implemented in various ways without being limited to the above-described embodiment and application examples.

For example, the embodiment and the like have been described above by taking the case of the I/O display panel 20 having the liquid crystal display panel provided with the backlight 15 as an example, but the backlight for display may double as a light for detection, or a light dedicated to detection may be provided. Moreover, when the light for detection is provided, it is preferable to use light in a wavelength range other than a visible-light range (for example, infrared ray).

Further, the embodiment and the like have been described above by taking the case in which reset operation and readout operation are performed for the sensor elements 33 for one line during a single ON period or OFF period in the backlight 15 (the case in which operation for turning on and off the backlight is performed at a high frequency) as an example, but the present application is not limited to this case. In other words, for example, the reset operation and the readout operation may be performed for the sensor elements 33 for two or more lines during a single ON period or OFF period in the backlight 15 (the operation for turning on and off the backlight may be performed at a low frequency).

Furthermore, the embodiment and the like have been described above by employing the display device with the input function, which has the display panel (I/O display panel 20) including the display pixels 31RGB and the sensor elements 33, but the present application is applicable to any device other than the display device. For example, in place of the I/O display panel 20, there may be provided a sensor panel in which only the sensor elements 33 are disposed in a matrix form within a single plane while the display pixels 31RGB are not provided.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A sensor device comprising:
   one or more sensor elements each including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element; and
   a sensor driving section configured to control on-off state of the first diode element through changing a gate voltage under a condition of a fixed cathode voltage, and to control on-off state of the second diode element through changing a gate voltage under a condition of a fixed anode voltage, thereby driving the sensor elements,
   wherein the sensor driving section drives the second diode element while maintaining a potential relationship represented by a first condition Vg2(off)<Vp2<Vg2(on), and performs, in transition from off-state to on-state of the second diode element, overdrive on the second diode element through temporarily applying a gate voltage Vg2(od) to the gate electrode while maintaining a potential relationship represented by a second condition Vg2(on)<Vg2(od), where Vp2, Vg2(on) and Vg2(off) represent the anode voltage, a gate voltage in the on-state, and a gate voltage in the off-state of the second diode element, respectively.

2. The sensor device according to claim 1, wherein the sensor driving section drives the first diode element while maintaining a potential relationship represented by a third condition Vg1(on)<Vn1<Vg1(off), and performs, in transition from off-state to on-state of the first diode element, overdrive on the first diode element through temporarily applying a gate voltage Vg1(od) to the gate electrode while maintaining a potential relationship represented by a fourth condition Vg1(od)<Vg1(on), where Vn1, Vg1(on) and Vg1(off) represent the cathode voltage, a gate voltage in the on-state, and a gate voltage in the off-state of the first diode element, respectively.

3. The sensor device according to claim 1, wherein the sensor element further includes a capacitive element connected to a junction of the first and second diode elements,
the first and second diode elements each produce electric charge according to an amount of incident light, and
the sensor driving section performs on-off control on the first and second diode elements individually, so that the electric charge produced by the first diode element is stored in the capacitive element when the first diode element enters the on-state and the second diode element enters the off-state, whereas the electric charge produced by the second diode element is released from the capacitive element when the second diode element enters the on-state and the first diode element enters the off-state.

4. The sensor device according to claim 3, further comprising:
an irradiation light source controlled to be on or off in synchronization with the on-off states of the first and second diode elements, and emitting irradiation light for detection to a proximity object close to the sensor element; and
a signal processing section obtaining, based on a detection signal acquired from the sensor element, object information including at least one of a position, a shape and a size of the proximity object,
wherein the sensor driving section controls the on-off states of the first and second diode elements, so that the electric charge is stored in the capacitive element according to a sum of an amount of reflected light deriving from the irradiation light and an amount of external light when the irradiation light is emitted from the irradiation light source, and the electric charge is released from the capacitive element according to an amount of external light when the irradiation light is not emitted from the irradiation light source.

5. The sensor device according to claim 1, wherein each of the first and second diode elements is a PIN photodiode that includes a p-type semiconductor region connected to the anode electrode, an n-type semiconductor region connected to the cathode electrode, and an intrinsic semiconductor region formed between the p-type semiconductor region and the n-type semiconductor region.

6. A method of driving a sensor element, comprising the steps of:
providing one or more sensor elements each including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element; and
controlling on-off state of the first diode element through changing a gate voltage under a condition of a fixed cathode voltage, and to control on-off state of the second diode element through changing a gate voltage under a condition of a fixed anode voltage, thereby driving the sensor elements;
wherein the second diode element is driven while maintaining a potential relationship represented by a first condition Vg2(off)<Vp2<Vg2(on), and overdriven, in transition from off-state to on-state of the second diode element, through temporarily applying a gate voltage Vg2(od) to the gate electrode while maintaining a potential relationship represented by a second condition Vg2(on)<Vg2(od), where Vp2, Vg2(on) and Vg2(off) represent the anode voltage, a gate voltage in the on-state, and a gate voltage in the off-state of the second diode element, respectively.

7. The method according to claim 6, wherein the first diode element is driven while maintaining a potential relationship represented by a third condition Vg1(on)<Vn1<Vg1(off), and overdriven, in transition from off-state to on-state of the first diode element, through temporarily applying a gate voltage Vg1(od) to the gate electrode while maintaining a potential relationship represented by a fourth condition Vg1(od)<Vg1(on), where Vn1, Vg1(on) and Vg1(off) represent the cathode voltage, a gate voltage in the on-state, and a gate voltage in the off-state of the first diode element, respectively.

8. A display device with input function, the display device comprising:
a display panel including a plurality of display pixels and a plurality of sensor elements, each of the sensor elements including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element;
a display pixel driving section driving the display pixels; and
a sensor driving section configured to control on-off state of the first diode element through changing a gate voltage under a condition of a fixed cathode voltage, and to control on-off state of the second diode element through changing a gate voltage under a condition of a fixed anode voltage, thereby driving the sensor elements,
wherein the sensor driving section drives the second diode element while maintaining a potential relationship represented by a first condition Vg2(off)<Vp2<Vg2(on), and performs, in transition from off-state to on-state of the second diode element, overdrive on the second diode element through temporarily applying a gate voltage Vg2(od) to the gate electrode while maintaining a potential relationship represented by a second condition Vg2(on)<Vg2(od), where Vp2, Vg2(on) and Vg2(off) represent the anode voltage, a gate voltage in the on-state, and a gate voltage in the off-state of the second diode element, respectively.

9. An electronic unit comprising a display device with input function, the display device comprising:
- a display panel including a plurality of display pixels and a plurality of sensor elements, each of the sensor elements including a first diode element and a second diode element, the first and second diode elements each having an anode electrode, a cathode electrode and a gate electrode, the second diode element being connected to the first diode element in series in such a manner that the cathode electrode of the second diode element is connected to the anode electrode of the first diode element;
- a display pixel driving section driving the display pixels; and
- a sensor driving section configured to control on-off state of the first diode element through changing a gate voltage under a condition of a fixed cathode voltage, and to control on-off state of the second diode element through changing a gate voltage under a condition of a fixed anode voltage, thereby driving the sensor elements, wherein the sensor driving section drives the second diode element while maintaining a potential relationship represented by a first condition $Vg2(off) < Vp2 < Vg2(on)$, and performs, in transition from off-state to on-state of the second diode element, overdrive on the second diode element through temporarily applying a gate voltage $Vg2(od)$ to the gate electrode while maintaining a potential relationship represented by a second condition $Vg2(on) < Vg2(od)$, where $Vp2$, $Vg2(on)$ and $Vg2(off)$ represent the anode voltage, a gate voltage in the on-state, and a gate voltage in the off-state of the second diode element, respectively.

* * * * *